US012783600B2

(12) United States Patent
Subramanian et al.

(10) Patent No.: US 12,783,600 B2
(45) Date of Patent: Nov. 3, 2026

(54) MULTI-TENANT SOLVER EXECUTION SERVICE

(71) Applicant: Amazon Technologies, Inc., Seattle, WA (US)

(72) Inventors: Shreyas Vathul Subramanian, Herndon, VA (US); Amey K Dhavle, Jersey City, NJ (US); Guvenc Degirmenci, Kirkland, WA (US); Kai Fan Tang, Port Coquitlam (CA); Daniel Romero, Haddon Township, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 1071 days.

(21) Appl. No.: 17/936,789

(22) Filed: Sep. 29, 2022

(65) Prior Publication Data

US 2024/0111831 A1 Apr. 4, 2024

(51) Int. Cl.
*G06F 17/18* (2006.01)

(52) U.S. Cl.
CPC .................................... *G06F 17/18* (2013.01)

(58) Field of Classification Search
CPC ...................................................... G06F 17/18
See application file for complete search history.

(56) References Cited

U.S. PATENT DOCUMENTS 8,417,715 B1 4/2013 Bruckhaus
10,977,111 B2 4/2021 Rungta et al.
11,288,540 B2 3/2022 Mandal et al.
2010/0161289 A1* 6/2010 Stojanovic ................ G06F 8/51 717/136

(Continued)

FOREIGN PATENT DOCUMENTS

EP 3933585 A1 1/2022

OTHER PUBLICATIONS

Invitation to Pay Additional Fees And, Where Applicable, Protest Fee mailed Jan. 29, 2024 in PCT/US2023/075320, Amazon Technologies, Inc., pp. 1-10.

*Primary Examiner* — Michael D. Yaary
(74) *Attorney, Agent, or Firm* — Alexander A. Knapp; Kowert, Hood, Munyon, Rankin & Goetzel, P.C.

(57) ABSTRACT

A multitenant solver execution service provides managed infrastructure for defining and solving large-scale optimization problems. In embodiments, the service executes solver jobs on managed compute resources such as virtual machines or containers. The compute resources can be automatically scaled up or down based on client demand and are assigned to solver jobs in a serverless manner. Solver jobs can be initiated based on configured triggers. In embodiments, the service allows users to select from different types of solvers, mix different solvers in a solver job, and translate a model from one solver to another solver. In embodiments, the service provides developer interfaces to, for example, run solver experiments, recommend solver types or solver settings, and suggest model templates. The solver execution service relieves developers from having to manage infrastructure for running optimization solvers and allows developers to easily work with different types of solvers via a unified interface.

20 Claims, 17 Drawing Sheets

(56) References Cited

U.S. PATENT DOCUMENTS

| | | | | |
|---|---|---|---|---|
| 2014/0128996 | A1 * | 5/2014 | Sayyarrodsari .. | G05B 19/41885 700/29 |
| 2019/0272307 | A1 | 9/2019 | Laddha | |
| 2021/0224665 | A1 | 7/2021 | Cheng et al. | |
| 2022/0122006 | A1 | 4/2022 | Ghosh et al. | |
| 2022/0253504 | A1 | 8/2022 | Mandal et al. | |
| 2022/0366494 | A1 | 11/2022 | Cella | |
| 2023/0048306 | A1 | 2/2023 | Roque | |
| 2023/0119664 | A1 | 4/2023 | Chakrabarty | |
| 2023/0213922 | A1 | 7/2023 | Bharadwaj | |
| 2024/0111832 | A1 | 4/2024 | Subramanian et al. | |
| 2024/0112067 | A1 | 4/2024 | Subramanian et al. | |

* cited by examiner

*create solver job request 300*

```
{
    "clientToken": "joe-token-584xyZ",                       310
    "jobName": "Flight Planning Solve",                      312
    "solverSpecification": {                                 320
      "solver": "OpenSolve-3.0",
      "solverRuntime": "Python-3.9",
      "solverLaunchCommand":
          "python flight-planning-model.py"
      "parameters": [
          "iterationLimit": 1000
      ]
    },
    "resourceParameters": {                                  330
      "vcpu": 6,
      "memory": 30
    },
    "inputConfiguration": {                                  324
      "inputStore": "joe-store-a94x0T",
      "inputKey": "flight-planning-model.py",
      "inputFormat": "OpenSolve-3.0"
    },
    "outputConfiguration": {                                 326
      "outputStore": "joe-store-a94x0T",
      "outputKey": "flight-planning-solution",
      "outputFormat": "CSV"
    },
    "tags": {                                                328
      "project": "Weekly planning"
    },
    "executionParameters": {                                 329
      "timeoutSeconds": 7200
    }
}
```

FIG. 3

*solver job status* 400

410

420

```
{
    “jobID”: “job-a8x58S9”,
    “jobName”: “Flight Planning Solve”,
    “createdAt”: “2022-08-30T15:49:00”,
    “startedAt”: “2022-09-01T12:00:02”,
    “stoppedAt”: null,
    “status”: “running”,
    “executionTime”: 0:30:40,
    “percentComplete”: 65,
    “statusDetails”: null,
    “executionLog”: {
        “logStore”: “joe-store-a94x0T”,
        “logKey”: “flight-planning-log”
    }
}
```

*FIG. 4*

MULTI-TENANT SOLVER EXECUTION SERVICE

BACKGROUND

Mathematical optimization is a widely used prescriptive analytics technique for solving complex decision-making problems. Optimization problems can be used to model many types of real-world problems, for example, minimizing cost for manufacturing, routing vehicles, or scheduling airplanes. Optimization solvers are specialized software that efficiently determine improved solutions to optimization problems. However, developers and data scientists face significant barriers when developing optimization applications, including spending time to choose the right solver, implementing a solver execution environment for the solver, benchmarking for a particular use-case, and balancing costs with integration effort. Apart from infrastructure requirements, some optimization solvers can create vendor lock-in, making it difficult for users to switch to or experiment with other solvers or compute options. These barriers can prevent users from evaluating different solver options, add months to project timelines, or worse, cause some companies to abandon optimization projects altogether.

BRIEF DESCRIPTION OF THE DRAWINGS

FIG. 3 illustrates an example request to create a solver job directed to a programmatic interface of the solver execution service, according to some embodiments.

FIG. 4 illustrates an example solver job status outputted by a programmatic interface of the solver execution service, according to some embodiments.

Figure 1:
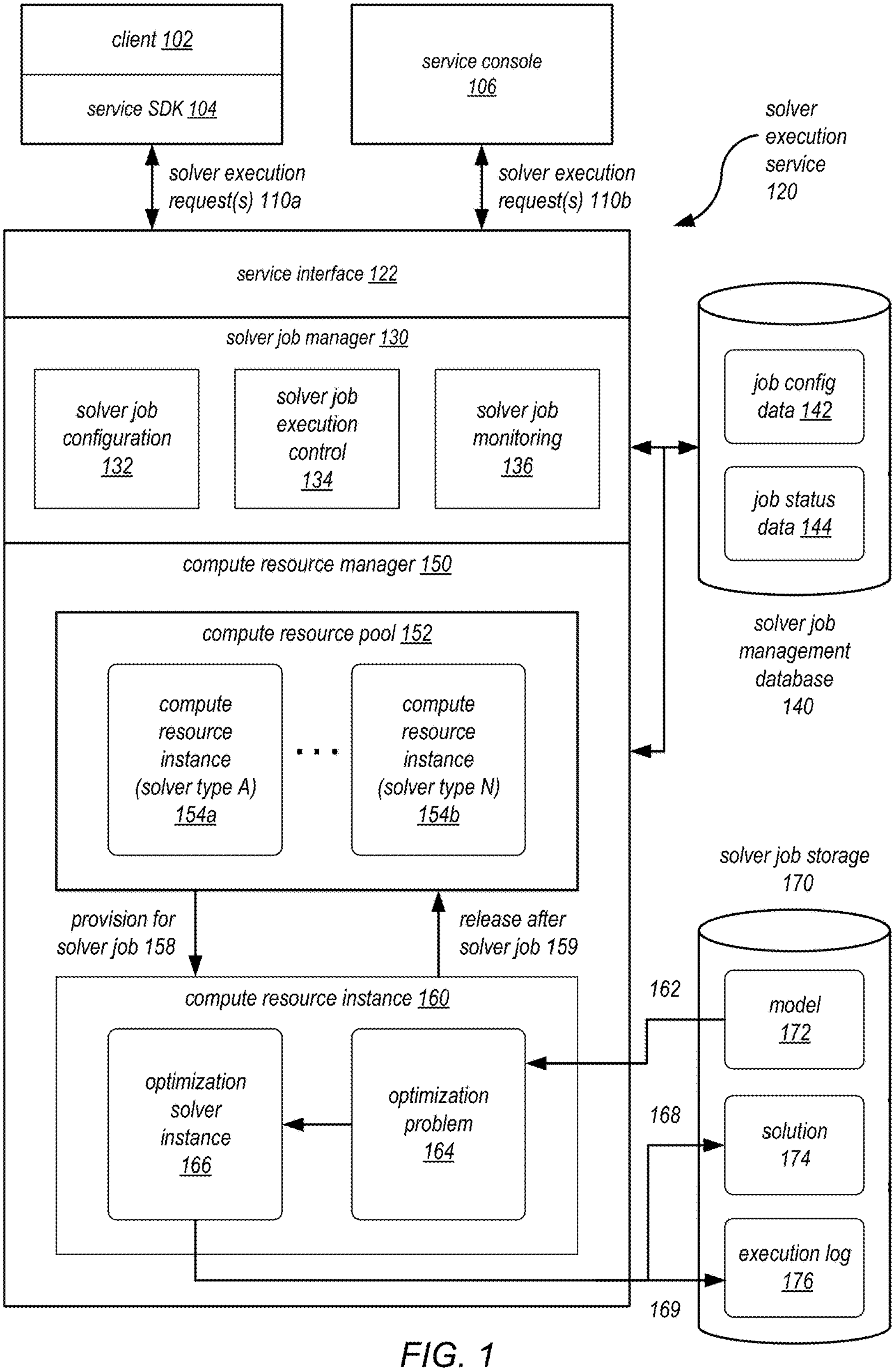
FIG. 1 illustrates a solver execution service that manages solver executions using different types of optimization solvers and compute resources, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Demand for optimization solvers has been growing steadily in recent years. However, current optimization solvers pose significant challenges to developers and data scientists when developing optimization applications. These include spending time choosing the right solver, implementing a solver execution environment for the solver, benchmarking the solver for a particular use-case, and balancing costs with integration effort. Apart from infrastructure requirements, current optimization solver providers often offer a limited array of the provider's own proprietary solvers for a use, and make it difficult for users to experiment with different solvers or compute options or switch to a different solver once development begins.

To address these and other problems in the state of the art, embodiments of a solver execution service are disclosed herein to enable developers and data scientists to easily define and solve large-scale mathematical optimization problems using different types of optimization solvers. In some embodiments, the solver execution service allows users to easily run and scale optimization workloads with no infrastructure to manage, provides a common interface to use multiple optimization solvers, and provides compute resources for the solvers so that optimizations can be run without upfront licensing or infrastructure costs.

Embodiments of the solver execution service allows developers to build optimization applications using their preferred optimization engines or based on their particular industry. Developers can use the service to run optimization code via a unified application programming interface (API) provided by the solver execution service, and solve optimization problems using multiple state-of-the-art solvers in a scalable and secure computing environment. If users are unsure of which solvers may be the most effective for their problem type, the solver execution service provides an experiment or benchmarking interface that allows users to experiment with multiple solvers in parallel. The experiments can be configured to return the first available answer or the best answer produced by the multiple solvers based on user requirements.

In some embodiments, the solver execution service will allow users to select a solver from multiple solver options from different solver providers and act as an intermediary between the different providers. In some embodiments, the service may provide translation tools to perform problem model translation from one type of solver to another. Developers can use the service to define variables, constraints, and objective functions for multiple types of optimization problems such as Linear Programs (LP), Constraint programs, Quadratic Programs (QP), Mixed Integer Linear (and non-Linear) Programs (MILP and MINLP), and Non-linear optimization problems, without having to worry about the choice of solver that is ultimately used. With a consistent programming interface and minimal up-front investment, developers can focus on their use case instead of solver selection or infrastructure and license management.

In some embodiments, the solver execution service is implemented on a cloud-based infrastructure provider network, giving users the capability to choose the type of compute resource used to run solver executions in a serverless manner. The infrastructure provider network is configured to handle the undifferentiated heavy-lifting of fleet planning, instance selection, container deployment and monitoring. In some embodiments, components of the solver execution service may be programmed to leverage other services of the infrastructure provider network, making the solver execution service a component service for building custom data analytic applications and pipelines hosted on the infrastructure provider network. For example, embodiments of the solver execution service can be programmatically connected with a machine learning service to enable launching of solver jobs from the machine learning service or triggering of machine learning jobs within the machine learning service.

In some embodiments, the solver execution service may implement a variety of developer tools and developer interfaces to enhance the experience of developers on the service. For example, the solver execution service may provide automatic translation between problem models written for different solvers. In some embodiments, the service may recommend a type of solver or a type of compute resource to use for a particular optimization problem. In some embodiments, the solver execution service may provide a template library for problem models, and offer recommended templates as a starting point for a new model. In some embodiments, the solver execution service allows developers to contribute model templates and configuration data to a centralized repository, so that such data can be used to make recommendations to other users of the service.

As will be appreciated by those skilled in the art, embodiments of the solver execution service disclosed herein are implemented in computer systems to solve existing technical problems in the state of the computing field and to improve the functioning of the current computer systems. These and other features and advantages of the disclosed system are discussed in further detail below, in connection with the figures.

FIG. 1 illustrates a solver execution service that manages solver executions using different types of optimization solvers and compute resources, according to some embodiments.

As shown, the figure depicts a solver execution service 120, which may be accessed either via a client application 102 or a service console 106. In some embodiments, the client 102 may be implemented as a remote application that embeds a service software development kit (SDK) 104, which is adapted to send solver execution requests **110*a* to a service interface 122 of the solver execution service 120. In some embodiments, the service interface 122 may be implemented as an API. The solver execution service 120 may be implemented as a web service, and the requests 110*a* may be specified in JavaScript Objection Notation (JSON). In some embodiments, the service console 106 may be implemented as a graphical user interface (GUI). The service console 106 may be a web-based interface that is displayed on a web browser. The service console 106 is adapted to submit solver execution requests 110*b* to the solver execution service 120 via the same service interface 122**.

As shown, embodiments of the solver execution service 120 may implement a solver job manager component or layer 130. The solver execution manager 130 may be tasked with providing solver job semantics to clients of the service, where a solver job represents a particular execution of a solver on a particular optimization problem. In some embodiments, the solver job manager 130 may hide certain details of an optimization run from clients (e.g. the compute resource used). However, in some embodiments, the client may have control over the type of compute resource used to run a solver job (e.g. the number of CPU cores or the amount of memory of the compute resource). In some embodiments, the solver execution service 120 is a multi-tenant service that is used by many clients at the same time, and individual solver jobs are isolated from one another in separate execution environments. In some embodiments, the solver execution service 120 does not return an immediate solution to a solver execution request 110. Rather, the service will schedule the solver job for execution, and an asynchronous notification is provided to the client when the solver job completes.

In some embodiments, the solver manager 130 may implement a solver job configuration component 132, which is tasked with various aspects related to the configuration of solver jobs in the service. For example, the solver job configuration component 132 may initially create a job configuration data object based on a solver execution request 110 or a job configuration file. The job configuration data object may be stored as job configuration data 142 in a solver job management database 140 maintained by the service. In some embodiments, each job configuration is assigned a unique job identifier to be used to launch instances of solver jobs in the future.

Depending on the embodiment, the job configuration data 142 may include different types of information about executing a solver job including the type of solver to use, solver parameters for the solver, the type of compute resource to use, resource parameters for the compute resource, and data locations for input and output data for the optimization run (e.g. the model 172 and the solution 174). In some embodiments, resources used by a solver job may be tagged with a specific tag to designate the resources as belonging to a particular solver job. These tags may be used for security enforcement, event dispatching, or other job management purposes. In some embodiments, the job configuration data 142 may include one or more job triggers for a solver job, which specifies an event, condition, or schedule for initiating the solver job.

In some embodiments, some of the items in the job configuration data 142 may not be explicitly specified by the solver execution request 110, but rather inferred by the solver job configuration component 132. For example, in some embodiments, the type of compute resource used by a solver job may be programmatically determined based on other information the solver execution request 110 (e.g. the type of solver for the solver job). As another example, the type of the solver used may be inferred based on the format of the model file 172.

As shown, in some embodiments, the solver job manager 130 may implement a solver job execution control component 134. This component 134 is configured to control the execution of solver jobs in the service, for example, the launching and termination of solver jobs. In some embodiments, component 134 may allow the client 102 to explicitly launch or stop a solver job. To launch a solver job, the solver job execution control component 134 may send resource requests to the compute resource manager 150, which will be responsible for provisioning and deprovisioning resources for solver job executions.

In some embodiments, the solver job execution control 134 may enable users to orchestrate a workflow of multiple solver jobs based on the job configuration data 142 or high level workflow configuration data. A workflow may be configured as a pipeline of several solver jobs that can be launched serially or in parallel, to carry out distinct stages that make up the workflow. For example, in some embodiments, one solver job may be configured to launch using output of a previous solver job. In another example, a particular stage within the workflow may be performed in parallel using multiple solver jobs. In some embodiments, the work flow may include other types of jobs that do not involve solvers, such as data preparation jobs, data translation jobs, or jobs that are performed by external services distinct from the solver execution service. In some embodiments, the solver job execution control 134 may be implemented or invocable from an external workflow orchestration service, so that the solver execution service 120 can be used to perform particular steps in a larger workflow process.

As shown, in some embodiments, the solver job manager 130 may implement a solver job monitoring component 136. This component 136 may be tasked with monitoring the status of solver jobs that are currently pending or running in the service. In some embodiments, job status data 144 about solver jobs are written to the management database 140 by the compute resources that are executing the solver jobs (e.g. compute resource instance 160). Such job status information may be made available to clients 102 via the service interface 122, or used as triggers for certain automated actions performed in the service. For example, in some embodiments, completion of a first solver job in the service may trigger a second solver job. As another example, a solver job that failed to complete may be automatically retried after a waiting period. Depending on the embodiment, the job status data 144 may indicate information such as the identifier of a solver job, timestamps of when a job execution was started or stopped, the execution time of the solver job, the current status of the solver job, a progress indicated (e.g. percentage completion) of the solver job, and the location of the execution log generated by the solver job.

As shown, in some embodiments, the solver execution service 120 implements a compute resource manager 150 that controls how resources are provisioned and used by the solver jobs. In some embodiments, the compute resource manager 150 may provide an internal API accessible to the solver job manager 130, which allows the solver job manager to request resources for solver jobs. The API may allow the solver job manager to specify the type of resource to provision for a particular job (e.g. a virtual machine or container instance having the appropriate solver software stack installed).

In some embodiments, the solver execution service 120 may execute solver jobs in a serverless manner. For example, the compute resource manager 150 may provision 158 resource(s) for a solver job on an as-needed basis, and release 159 the resource(s) when the solver job is finished. In this manner, just a small amount of resources is needed to support a potentially large number of concurrent solver jobs, thereby increasing the resource usage efficiency of the service.

In some embodiments, the compute resource manager 150 may maintain a compute resource pool 152 of compute resource instances. The pool may include compute resource instances (e.g. virtual machine instances or container instances) that have different types of solver software installed thereon (e.g. solver type A on compute resource instance 154*a* and solver type N on compute resource instance 154*b*). In some embodiments, the compute resource manager may implement a different resource pool 152 for each type of compute resource or solver used by the service, and each pool may be dynamically scaled up or down based on the observed demand for the pool. In some embodiments, the resource instances in the pool may be kept in a dormant or standby state where they are not actively executing, and activated when they are provisioned to a solver job.

In some embodiments, instead of a resource pool 152, the compute resource manager may simply maintain virtual machine or container images for different types of solvers used by the solver execution jobs. When a compute resource is provisioned for a solver job, a virtual machine or container instance is launched using one of the images.

Embodiments of the solver execution service may support multiple types of compute resources such as different types of virtual machine instances, container instances, etc. The virtual machine instances may include instances that are managed by different types of hypervisors, that implement different types of processors (e.g. graphics processing units (GPUs)) or memory, and that employ different types of operating systems. The container instances may be implemented using different types of container management software with different container characteristics. In some embodiments, the solver execution service may support quantum computing resources as a type of resource for executing solver jobs. In some embodiments, some of the compute resources supported by the service may be provided by another service distinct from the solver execution service itself.

In some embodiments, the compute resource manager 150 will select the particular compute resource instance 160 to execute a solver job. The compute resource instance 160 may be selected based on the resource requirements of the solver job, which may be specified via the client's solver execution request 110. In some embodiments, the solver execution service may select multiple computer resource instances 160 to execute a solver job in a distributed manner. For example, the configuration for a solver job may indicate that the solver job may be partitioned into separate portions which can be processed independently. In some embodiments, the solver job configuration may specify details about the multiple compute resource instances to use for the solver job, including characteristics of the distributed computing system to be constructed from the multiple compute resource instances.

The selected compute resource instance 160 will include a software stack that includes the type of solver for the solver execution. In some embodiments, the solver may be implemented in third-party software having its own programming interface. For some types of solvers, the model is a file written in a declarative problem modeling language, such as LP, and the solver will simply consume this file. For other solvers, the model is written in a programming language, such as C, Java, or Python, and the model code calls a solver library to build a data structure of the optimization problem and solve the optimization problem using the data structure. In this case, the model is executable code that has an entry point and can span multiple files. For this second type of solver, the compute resource instance will include a programming language runtime for executing the model code, as well as any other solver libraries needed to support the model code. In some embodiments, the client may specify external software libraries to be used for the solver execution, and the compute resource manager 150 will dynamically install such libraries when the compute resource is provisioned. In some embodiments, the type of compute resource may be selected based on a machine learning model, which is trained to determine the appropriate type of resource to use based on the type of solver, type of problem model, or execution parameters.

Depending on the embodiment, the provisioning of a compute resource instance may involve a number of steps. In some embodiments, the compute resource instance 160 may be configured with access privileges to access the solver job storage 170, which may be located remotely from the compute resource instance 160. As shown, the solver job storage 170 may be used to store the data associated with a solver job, such as the model 172, the solution 174, and the execution log 176 generated by the execution. In some embodiments, the solver execution service 120 is a multi-tenant service that allows many clients to run their respective solver jobs concurrently. In such embodiments, the solver execution service may implement certain security policies that isolate each solver job to its own execution environment on a separate resource instance. In some embodiments, no two solver jobs will share a common execution environment, and respective execution environments of different solver jobs are not permitted to communicate directly with one another. In some embodiments, the compute resource instance 160 may be tagged with one or more resource tags as required by the solver job configuration. In some embodiments where the data in the solver job storage is encrypted, the compute resource instance 160 may be provided a key for decrypting or encrypting the data.

Once the compute resource instance 160 is provisioned for the solver job, the compute resource manager 150 will launch an optimization solver instance 166 on the compute resource instance, for example, by invoking a command on the compute resource instance. The solver instance 166 will read 162 the model 172 from the solver job storage 170, to create an in-memory version of the optimization problem 164 on the compute resource instance 160. The solver execution will then run the optimization algorithm on the optimization problem 164 until the problem is solved or the solver job is stopped or timed out. If an acceptable solution to the optimization problem is found, the solution is written 168 to a solution file or object 174 in the solver job storage 170. Additionally, in some embodiments, execution data of the optimization run may be logged 169 to an execution log 176 at the solver job storage 170. The execution log 176 may be stored as a file or persistent object, or in some embodiments, exposed as a data stream that can be subscribed to by other software components and handled accordingly. The execution log 176 may capture data such as execution performance data, intermediate or final data and results, solver type and resource parameters, compute resource type and compute resource parameters, and the like. In some embodiments, as the solver execution executes, the progress and/or status of the solver job will be monitored by the compute resource instance 160 or the compute resource manager 150, and such information is posted to the solver job management database 140 as job status data 144.

In some embodiments, after the solver job finishes executing, the compute resource instance is deprovisioned or released 159. A release may involve cleaning up artifacts of the solver job on the compute resource instance and releasing the resource instance back to the resource pool 152 for use by later solver jobs. In some embodiments, access privileges that were granted to the compute resource instance are revoked, and any tags that were assigned to the compute resource instance are removed. In some embodiments, the compute resource instance 160 may simply be terminated. In some embodiments, the solver execution service may implement a default timeout parameter so that every solver job will be terminated within a bounded time. This bounded time may be a configurable parameter that can be modified by the clients 102.

Figure 2:
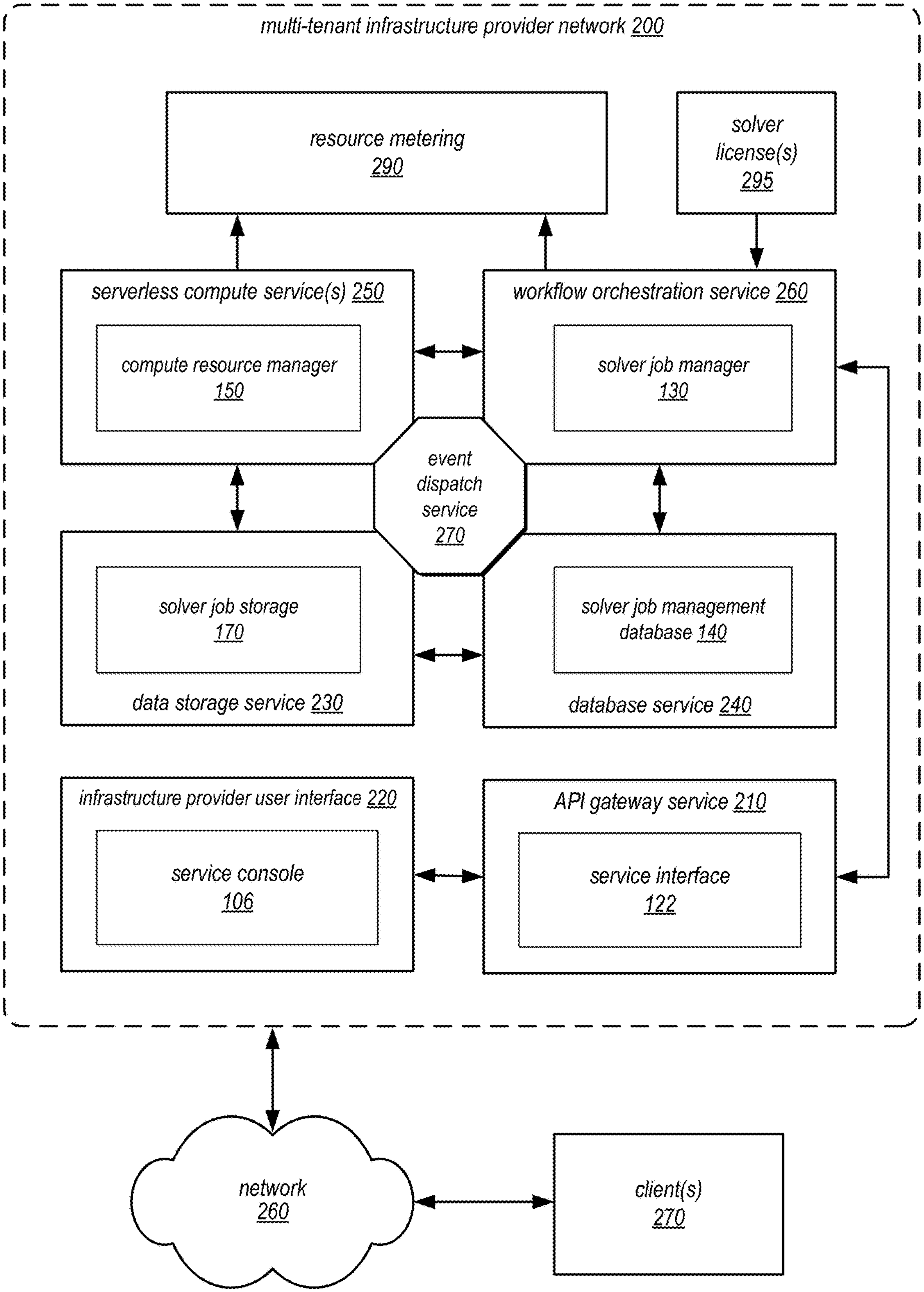
FIG. 2 illustrates a multi-tenant infrastructure provider network that implements components of the solver execution service, according to some embodiments.

FIG. 2 illustrates a multi-tenant infrastructure provider network that implements components of the solver execution service, according to some embodiments.

The depicted multi-tenant infrastructure provider network 200 may be a private or closed system or may be set up by an entity such as a company or a public sector organization to provide one or more services (such as various types of cloud-based storage) accessible via the Internet and/or other networks to clients 270 in client premises networks, in some embodiments. The provider network 200 may be implemented in a single location or may include numerous data centers hosting various resource pools, such as collections of physical and/or virtualized computer servers, storage devices, networking equipment and the like, needed to implement and distribute the infrastructure and services offered by the provider network 200. In some embodiments, provider network 200 may implement various computing systems, resources, or services, such as an API gateway service 210, an infrastructure provider user interface 220, a data storage service 230, a database service 240, serverless compute service(s) 250, a workflow orchestration service 260, an event dispatch service 270, and a resource metering service 290.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 17 and described below. In various embodiments, the functionality of a given system or service component may be implemented by a particular node or may be distributed across several nodes. In some embodiments, a given node may implement the functionality of more than one service system component (e.g., more than one data store component).

In some embodiments, the API gateway service 210 is a managed service of the provider network 200 that allows developers to publish custom APIs for their hosted services. For example, the API gateway service 210 may support various types of RESTful or WebSocket APIs to enable real-time two-way communication between the service and the client. The API gateway service 210 may implement various features such as traffic management support, dynamic scaling, authorization and access control, throttling, monitoring, and API version management. In some embodiments, the API gateway service may be implemented using a serverless execution model, where the nodes handling API requests are provisioned on demand. As shown, the API gateway service 210 may be used to implement the service interface 122 of FIG. 1.

In some embodiments, the infrastructure provider user interface 220 may be a web-based graphical user interface provided by the infrastructure provider network that allows users to manage the operations of different services offered by the infrastructure provider. In some embodiments, the user interface 220 may be used to provide configuration or management of custom services. In some embodiments, the user interface 220 may provide user functionality such as authentication and login, user account management, identity and access management, resource monitoring and metering control, among others. As shown, in some embodiments, the infrastructure provider user interface 220 may be used to provide the service console 106 for the solver execution service.

In some embodiments, the data storage service 230 may be a file system or object-based storage service that allocates specific storage locations to clients for long-term storage. In some embodiments, individual objects in the data storage service are identified by a unique storage location and object key. Depending on user configuration, the data storage service 230 may automatically perform a variety of data management tasks such as backup and recovery, encryption/decryption, data change tracking, etc. As shown, in some embodiments, the solver job storage 170 for the solver jobs may be implemented in the data storage service 230. In a multi-tenant environment, the solver execution service will treat the solver storage location of each client as private data that cannot be accessed by other clients without authorization.

In some embodiments, the database service 240 may be a type of structured data storage and processing service that perform general or specialized data storage and processing functions (e.g., analytics, big data querying, time-series data, graph data, document data, relational data, non-relational data, structured data, semi-structured data, unstructured data, or any other type of data processing operation) over data that is stored across multiple storage locations, in some embodiments. For example, the data storage or database service(s) 240 may include various types of data storage services (e.g., relational, NoSQL, document, or graph databases) for storing, querying, and updating data. Such services may be enterprise-class database systems that are scalable and extensible. Queries may be directed to a database in database service(s) 240 that is distributed across multiple physical resources, and the database system may be scaled up or down on an as needed basis, in some embodiments. The database system may work effectively with database schemas of various types and/or organizations, in different embodiments. In some embodiments, clients/subscribers may submit queries or other requests (e.g., requests to add data) in a number of ways, e.g., interactively via an SQL interface to the database system or via Application Programming Interfaces (APIs). In other embodiments, external applications and programs may submit queries using Open Database Connectivity (ODBC) and/or Java Database Connectivity (JDBC) driver interfaces to the database system. As shown, the solver job management database 140 may be implemented in the database service 240.

In some embodiments, serverless compute service(s) 250 may be implemented by provider network 200 to offer compute instances (e.g. virtual machines, containers, and/or functions) according to various configurations for client operations. The serverless compute service(s) 250 are configured to provide the compute resources in a serverless manner, where the resources are allocated on demand to execute incoming requests. Depending on the embodiment, the serverless compute service(s) will handle resource management tasks such as capacity planning, configuration, fault recovery, and scaling, and relieve the clients of the service from having to contend with such details.

A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). For example, a particular virtual machine may be configured with a specified number or particular type of GPU processor. A container may provide a virtual operating system or other operating environment for executing or implementing applications. A function may be implemented as one or more operations that are performed upon request or in response to an event, which may be automatically scaled to provide the appropriate number computing resources to perform the operations in accordance with the number requests or events. In some embodiments, the solver execution service may use quantum computing resources to solve optimization problems, which may be provided by a separate quantum computing service in the infrastructure provider network 200. The quantum computing service may support a variety of third-party quantum computing platforms hosted on resources of the infrastructure provider network 200. A number of different types of computing devices may be used singly or in combination to implement the compute instances, containers, functions and/or quantum compute resources of provider network 200 in different embodiments, including general purpose or special purpose computer servers, storage devices, network devices and the like. As shown, the compute resource manager 150 used by the solver execution service may be implemented by the serverless compute service(s) 250.

In some embodiments, the solver execution service 120 may assign solver jobs to the compute resources in a manner to isolate the security jobs from one another. The way that solver jobs are isolated may be defined via a security policy, which may be configurable by an administrator of the service. In some embodiments, the solver execution service will confine each solver job to its own execution environment, where no two solver jobs can run on the same virtual machine or container instance and/or directly communicate with one another. In some embodiments, solver jobs may be prohibited from sharing certain infrastructure or data with other solver jobs. For example, a solver job may be limited to its own virtual network interface or data storage location. In some embodiments, each solver job may be assigned a particular virtual private cloud (VPC) endpoint, so that data sent or received by the solver jobs are confined to the provider network without traveling over the public Internet. In some embodiments, the compute resource instances used by the solver execution service are placed into one or more VPCs that are not addressable or visible from outside the service.

In some embodiments the provider network 200 may implement a workflow orchestration service 260. The workflow orchestration service may allow a user to define a workflow using capabilities of other services in the provider network 200. In some embodiments, the solver job manager 130 may be implemented using the workflow orchestration service or be integrated with the workflow orchestration service, so that solver jobs in the solver execution service can be configured as steps within a workflow or execution pipeline. The workflow orchestration service may define various aspects of how workflow steps are initiated and executed. For example, a particular workflow step may be configured to execute immediately after a previous workflow step, or in parallel with another workflow step. The workflow orchestration service may also implement some form of flow control. For example, a workflow may execute a first workflow step if an execution condition is met, and a second workflow step if the execution condition is not met. Workflows implemented using the workflow orchestration service may span multiple types of services, including other data analytics services or machine learning services implemented in the provider network.

In some embodiments, the provider network 200 may implement an event dispatch service 270 that allows events or notifications to be generated and propagated among different services of the provider network. In some embodiments, the event dispatch service 270 may provide an interface that allows one service to subscribe to a category of events generated by another service. Once subscribed, the former service will be notified whenever a new event is generated by the later service. The propagation of events may be controlled based on resource tags of resources in the services. For example, in some embodiments, only resources tagged with a particular solver job tag are permitted to see events generated by other resources tagged with the same tag. As shown, in some embodiments, the event dispatch service 270 may be used to connect components of the solver execution service to enable event-driven behavior within the solver execution service. For example, in some embodiments, a new solver job may be initiated by the solver job manager 130 as soon as a model change event occurs in the solver job storage 170. As another example, the termination of a virtual machine instance 160*a* associated with a solver job may automatically cause the status of the job to be updated in the solver job management database 140.

In some embodiments, the resource metering service 290 is a monitoring service in the provider network that tracks client usage of various services. Client usage may be tracked according to various usage metrics specified by the service operation, such as the number of resource instances launched during a period, the number of solver jobs executed during a period, the amount of time used to solve optimization problems, etc. In some embodiments, the usage data of a particular client may be used to assess a usage fee on the client. In some embodiments, if usage of the service exceeds a certain quota or limit (e.g. a maximum number of solver execution requests for a specified period), the service may throttle or deny further client solver execution requests.

As shown, in some embodiments, the provider network 200 may hold one or more solver license(s) 295 for optimization solvers that are used in the solver execution service. For some types of commercial solvers, clients of the solver execution service may be assessed a license fee based on their usage of such services. In some embodiments, the solver execution service may permit clients to execute solvers under their own licenses. In that case, the solver execution service may permit the licenses to be enforced via other enforcement mechanisms. For example, in some embodiments, the solver execution service may permit clients to specify a specific license file or credential that is verified by the solver software before execution.

Generally speaking, the clients 270 may encompass any type of client configurable to submit network-based requests to provider network 200 via network 260. For example, a given client 270 may include a suitable version of a web browser, or may include a plug-in module or other type of code module that may execute as an extension to or within an execution environment provided by a web browser. Alternatively, a client 270 may encompass an application such as a database application (or user interface thereof), a media application, an office application or any other application that may make use of resources in the provider network 200 to implement various features, systems, or applications. (e.g., to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application that interacts directly with provider network 200. In some embodiments, a client 270 may be the client 102 of FIG. 1 or implement the service console 106 of FIG. 1.

The clients 270 may convey network-based services requests (e.g., solver execution requests 110) to and receive responses from provider network 200 via network 260. In various embodiments, network 260 may encompass any suitable combination of networking hardware and protocols necessary to establish network-based-based communications between clients 270 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, a given client 270 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and provider network 200. It is noted that in some embodiments, clients 270 may communicate with provider network 200 using a private network rather than the public Internet.

FIG. 3 illustrates an example request to create a solver job directed to a programmatic interface of the solver execution service, according to some embodiments. The depicted create solver job request 300 is a type of solver execution request 110 of FIG. 1 supported by the service interface 122 of the solver execution service.

As shown, in some embodiments, the create solver job request 300 may be specified in JSON format. In some embodiments, the request 300 may simply create configuration data for a new solver job in the job management database 140. In some embodiments, the request 300 may cause the new solver job to be executed. Because a solver execution can be long running, the solution to the solver job is not returned in response to request 300. Rather, the response to request 300 may indicate a job identifier of the solver job that was created or initiated. This job identifier can be used by the client to monitor the progress of the job during execution. When the solver job completes, a notification may be provided asynchronously to the client that initiated the job, indicating the job identifier and optionally the solution.

As shown, in this example, request 300 indicates a client token 310 associated with the solver job to create, which is unique for each request to ensure idempotency. In some embodiments, if the client token 310 is not specified, a randomly generated token is used for the request. The job name 312 may be an optional name for the job, which does not have to be unique. The solver specification 320 is a container that specifies various solver parameters. For example, this section may specify the type of solver to use for the solver job, a solver runtime to execute model code for the solver, a launch command to launch the solver job, and various execution parameters of the solver. Depending on the type of solver, the launch command may be an operating system command or a solver-specific command that is recognized by the solver. The launch command may indicate the model file, which may be an executable script, or some other type of entry point to begin executing the solver job. In some embodiments, the solver specification section 320 may also specify parameters such as an external solver library to be deployed for the solver job and a license file or credential to verify solver licensing for running the solver job.

As shown, resource parameters 322 is a container that specifies parameters and/or requirements for the compute resource(s) used to execute the solver job. In this example, this section specifies the number of vCPUs to assign to the job and the amount of memory to assign to the job. In some embodiments, the resource parameters section 322 may also specify resource identifiers corresponding to particular combinations of resource specifications (e.g. the operating system used on a virtual machine). In some embodiments, the resource parameters may specify a custom virtual machine or container image provided by a client to use for the solver job.

As shown, input configuration 324 is a container that specifies where the input for the solver job is located and other details about the input. For example, the input store indicates a storage location of a storage service containing the model. The input key indicates the object key of the model. In some embodiments, the input configuration information may indicate a version identifier along with the object key, if the object is a versioned object. In some embodiments, the input configuration may indicate the model format of the model. If the model contains model code, the input configuration may also indicate a programming language runtime that can be used to execute the model code.

As shown, output configuration 326 is a container that specifies where output of the solver job is to be written and other details about the output. In some embodiments, the output of the solver job will default to the same location as the input of the solver job. In some embodiments, the output configuration may indicate the output format of the solution. The output configuration may also indicate various encryption options for writing the output, including a particular encryption key to use to encrypt the solution generated by the solver job.

As shown, the request 300 may also specify other types of parameters associated with the solver job such as any tags 328 used to tag resources associated with the job, and any additional execution parameters 329 associated with the solver job. Execution parameters 329 may include parameters that are managed by the solver execution job service itself, as opposed to native execution parameters for the solver.

In some embodiments, the API of the solver execution service may support many different types of API requests, in addition to the request 300 to create or execute a solver job. For example, the API may support a request to cancel or stop a solver that was previously submitted or running. The API may also support a request to list currently running or submitted jobs, and return a list of job identifiers. The API may also support a describe job request that returns the configuration details of a particular solver job (e.g. the job parameters specified in request 300). In some embodiments, the API may allow clients to add additional tags to a solver job and remove tags from the solver job after the job's creation. In some embodiments, the API may allow clients to add and remove job triggers to a solver job. A job trigger may be used to specify a condition or schedule for launching the solver job.

FIG. 4 illustrates an example solver job status outputted by a programmatic interface of the solver execution service, according to some embodiments. The depicted status output 400 may be returned by the solver execution service as a response to a request submitted to the service (e.g. a request to get the status of a particular solver job), or an event that is broadcast by the service (e.g. over the event dispatch service 270 of FIG. 2). In some embodiments, the job status output 400 may indicate some of the job configuration parameters of the solver job, including those parameters discussed in connection with FIG. 3.

As shown, in this example, the job status output indicates the job identifier 410 assigned to the solver job and the user-assigned job name. Additionally, the job status output 400 indicates a number of time-related items including the time when the solver job was first created, the time when the job started execution, the time when the job stopped executing (if available), and the total execution of the job. The job status output 400 also indicates a current status of the solver job which may be changed as the job progresses. In some embodiments, the job status flag may have a set of values such as: submitted, running, succeeded, failed, timed out, etc. The job status output in this example also indicates a percentage complete value of the solver job progress indicator. In some embodiments, this value may be determined based on an estimated completion time of the solver job, which may in some cases be generated by the solver itself. In some embodiments, the information contained in the solver job status 400 may be displayed on a management interface of the solver execution service to indicate the progress and current status of all solver jobs submitted by a particular client.

Finally, as shown, the status output 400 may indicate the location of the execution log 420, which is used to log different types of execution data during the solver execution.

For example, the execution log may include data such as the solver and resource parameter used, the times associated with individual stages of the solver job and the values of intermediate and the final results, and any performance data or errors associated with the solver execution. In some embodiments, the execution log is generated in a vendor neutral format, but may include certain native outputs from the specific solver. In some embodiments, the information in the execution log may be used by recommendation systems in the solver execution service to recommend job configuration parameters for other solver jobs.

Figure 5:
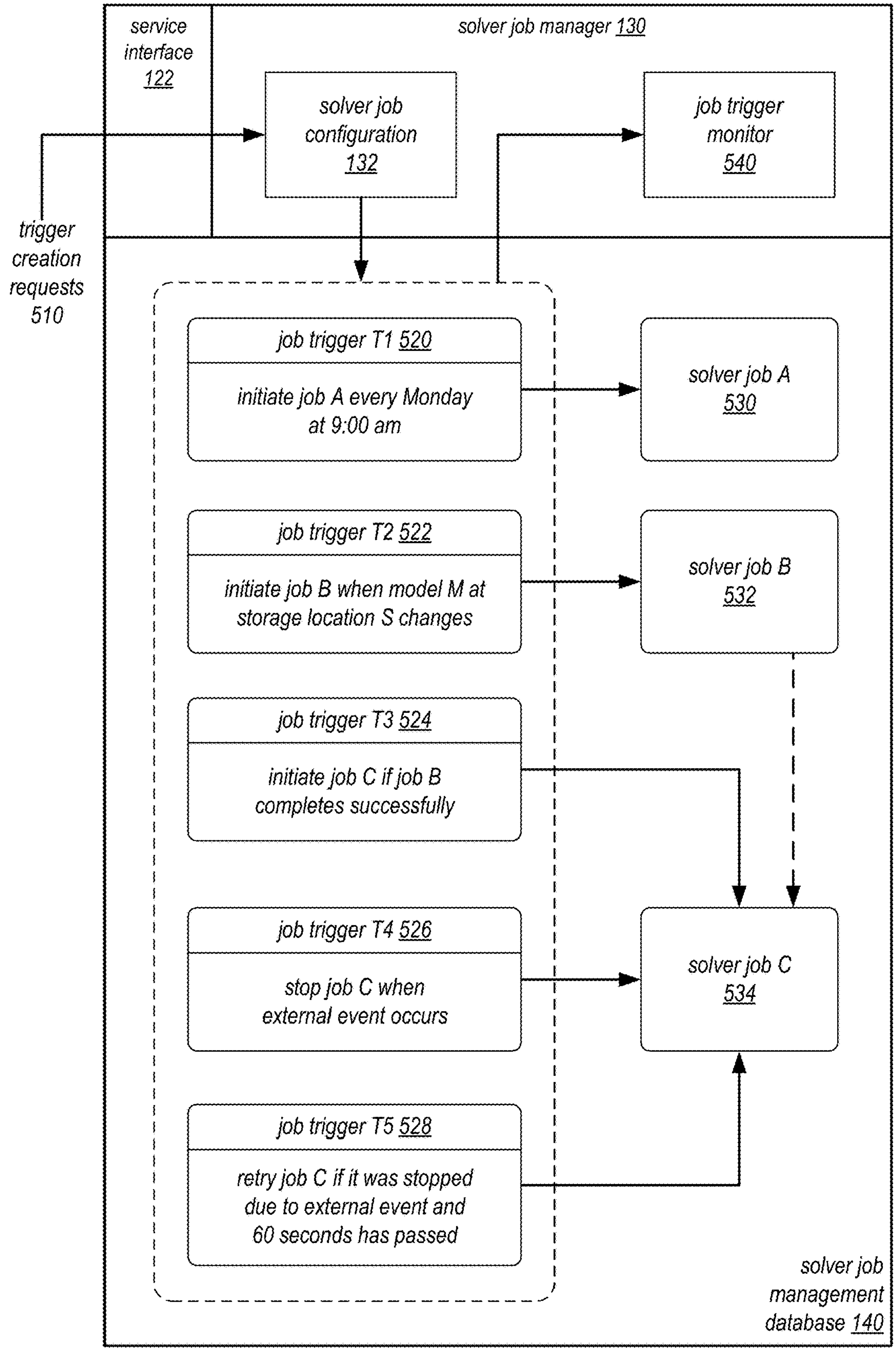
FIG. 5 illustrates different job triggers that can be associated with solver jobs in the solver execution service, according to some embodiments.

FIG. 5 illustrates different job triggers that can be associated with solver jobs in the solver execution service, according to some embodiments.

In some embodiments, the solver execution service allows clients to associate triggers to solver jobs, which are used to control when solver jobs are programmatically launched or repeated. As shown, the triggers 520, 522, 524, 526, and 528 may be defined via the solver interface 122, which may provide an API for trigger creation requests 510. These requests 510 may be handled by the solver job configuration component 132 in the solver job manager 130, to save job triggers to the solver job management database 140. In some embodiments, the service interface 122 may provide an API that supports requests to create, delete, modify, describe, and list triggers satisfying a particular search criterion. In some embodiments, these types of triggers may be implemented outside the solver execution service, for example, as control elements of a workflow defined in workflow orchestration service 260 of FIG. 2.

In some embodiments, job triggers are used to specify launch conditions for solver jobs. For example, job trigger T1 520 specifies a particular schedule for launching solver job A 530. The launch schedule may be specified in the trigger creation request 510 using a cron expression (e.g. "cron(0 20 * * ? *)") or a rate expression (e.g. "rate(5 minutes))". As shown, trigger T2 522 causes solver job B 532 to be launched upon the occurrence of a particular event, here, when a model M at storage location S is updated. Such an event may be generated by a storage service and broadcast via the event dispatch service 270 of FIG. 2.

As another example, solver job C 543 is associated with three job triggers T3 524, T4 526, and T5 528. Trigger T3 specifies another type of launch condition for launching job C, which will launch if solver job B completes successfully (e.g. produces a solution without errors). Accordingly, trigger T3 effectively links solver job B and solver job C to execute back-to-back. Trigger T4 specifies a condition for stopping job C when an external condition occurs (e.g. when an upstream dataset outside the solver execution service is changed). Trigger T5 specifies to retry solver job C if it was stopped due to the external event, after 60 seconds has passed. As may be appreciated by those skilled in the art, many different types of triggers may be defined for solver jobs to achieve a variety of job execution or stoppage conditions or schedules.

As shown, in some embodiments, the solver job manager 130 may implement a job trigger monitor 540 that continuously monitors for occurrence of trigger events specified by triggers in the system, and responsively initiate execution of associated solver jobs. In some embodiments, if a job trigger specifies a regular and predictable schedule (e.g. trigger T1), the solver execution service may pre-provision the compute resources needed by the associated solver job so that the job can be launched with very little latency.

Figure 6:
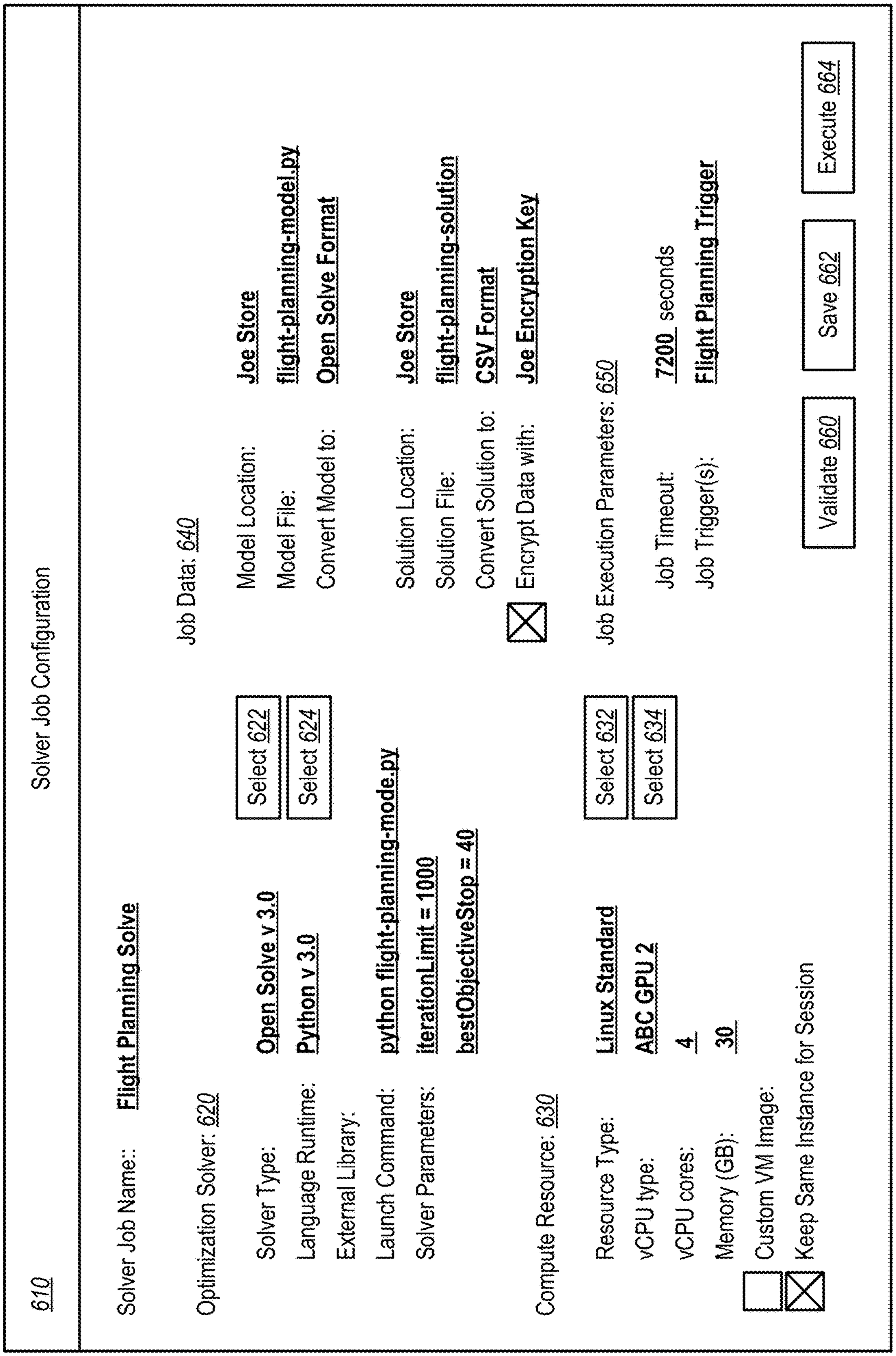
FIG. 6 illustrates a user interface that allows users to configure a solver job in the solver execution service, according to some embodiments.

FIG. 6 illustrates a user interface that allows users to configure a solver job in the solver execution service, according to some embodiments. The depicted solver job configuration interface 610 may be implemented by the service console 106 of FIG. 1.

As shown, the GUI 610 allows a user to specify various configuration settings for a new solver job, or modify configuration settings of an existing solver job. Some of the configuration settings editable via the GUI 610 may be the same configuration settings that are specified by create solver job request 300 of FIG. 3. For example, GUI 610 allows the user to specify the solver job's name. Section 620 allows the user to specify the type of optimization solver to use for the solver job, and if necessary, the language runtime used to run model code for the solver, a launch command to indicate an entry point for the solver job, and any external libraries needed by the solver. Solver libraries may be runtime libraries that can be dynamically loaded with the optimization solver to provide a variety of added functionality such as machine learning or deep learning algorithms, routing optimization, zero shot constraint satisfaction, forecast to job schedule, cohort clustering to ad serving, and asynchronous Bayesian optimization, etc.

In some embodiments, the GUI 610 provides user selection controls 622 and 624 that allows the user to select from multiple solver types or language runtimes supported by the service.

As shown, section 630 on the GUI 610 allows the user to specify the type of compute resource and different resource parameters for the compute resource used to run the solver job. In this example, a selection control 632 is used to select a type of virtual machine for the solver job, including the number of vCPUs and machine memory. Additionally, the GUI 610 in this example provides another selection control 634 to select a vCPU type of the virtual machine. In some embodiments, the GUI 610 may allow the user to select from among many types of computing resources including virtual machines, containers, serverless functions, and quantum computing resources as different options for the execution environment. In some embodiments, the GUI 610 may allow the user to specify multiple instances of a compute resource to build a distributed execution environment (e.g. a cluster of connected virtual machine instances) for the solver job. In some embodiments, the GUI 610 may allow the user to choose a custom virtual machine or container image to execute the solver job. In some embodiments, the GUI 610 may allow the user to specify that the compute resource used for a solver job should be kept alive for a user session to run other solver jobs in the same session. This feature is useful for interactive developer sessions (e.g. a notebook session) when the user may run multiple short solver jobs for experimental purposes, and allows the solver execution service to reuse the same compute resource for these short solver jobs.

As shown, section 640 allows the user to specify data aspects of the solver job, such as the location and name of the model file, the location and name of the solution file, and the format of the input and output data files. In some embodiments, the user may specify that a particular data file should be encrypted using a particular encryption key.

As shown, section 650 allows the user to modify additional job execution parameters associated with the solver job. These job execution parameters may be configuration parameters exposed by the solver execution service, as opposed native configuration parameters of the optimization solver. As shown here, examples of such additional parameters may include a job timeout parameter and one or more job triggers.

As shown, the GUI 610 provides a number of buttons to initiate actions based on the job configuration data. The validate button 660 may be used to validate the job configuration. In some embodiments, a validation of the job configuration may cause the service to attempt to provision resources for the solver job and launch the solver job. An error received during the launch process will cause the validation to fail. The save button 662 will cause the current job configuration to be saved by the service, for example, to the solver job management database 140 of FIG. 1. Finally, the execute button 664 will actually cause the configured solver job to be launched (or added to the launch queue).

Figure 7:
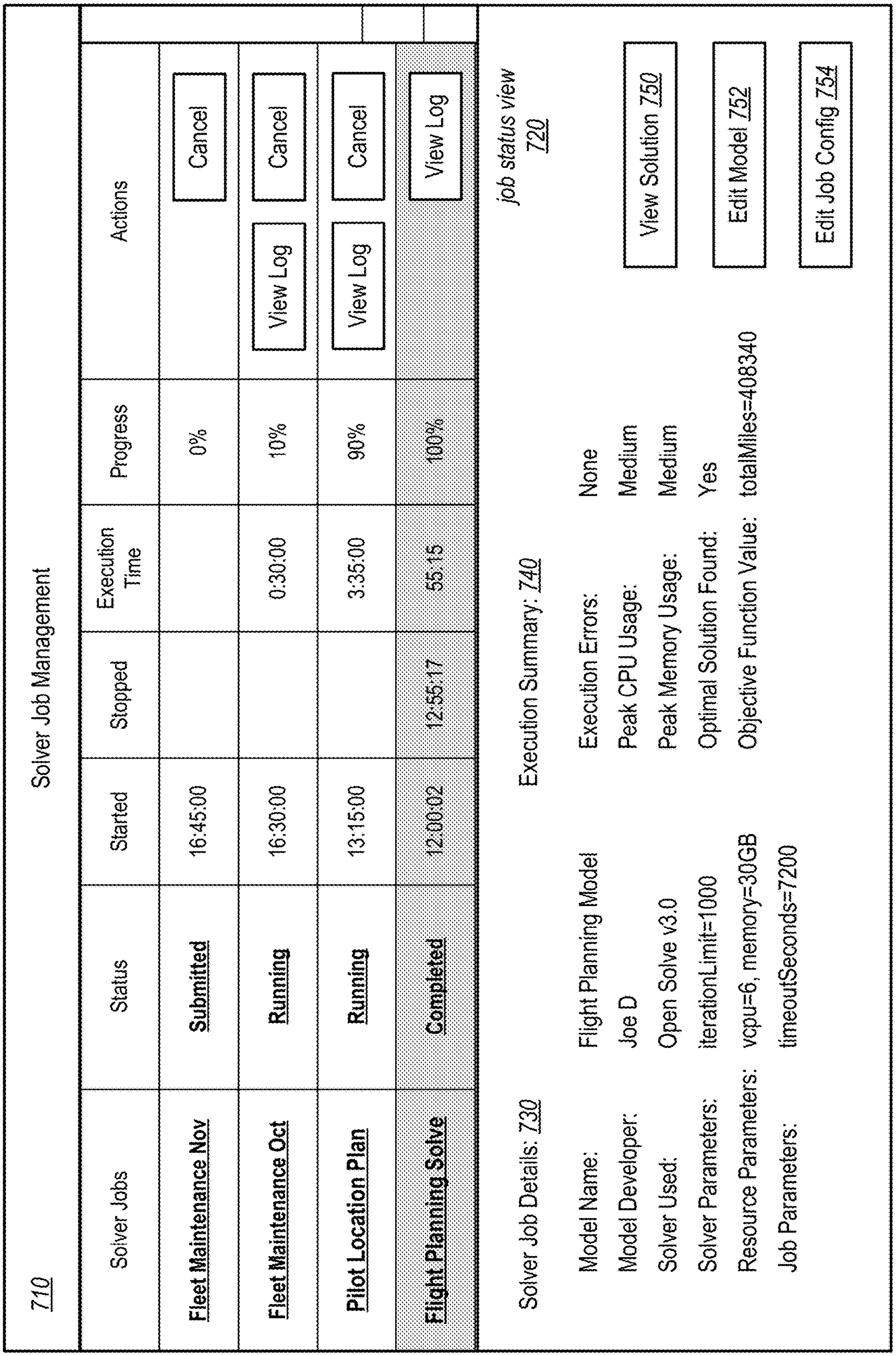
FIG. 7 illustrates a user interface that allows users to manage solver jobs in the solver execution service, according to some embodiments.

FIG. 7 illustrates a user interface that allows users to manage solver jobs in the solver execution service, according to some embodiments. The depicted solver job management interface 710 may be implemented by the service console 106 of FIG. 1.

As shown, GUI 710 includes a table that lists a number of solver jobs that have been submitted to the solver execution service. In some embodiments, the listing may indicate solver jobs that are submitted but not yet executing, jobs that are currently executing, and jobs that have recently completed execution. Some of the data shown in the listing may be job status data received via the solver job status data structure 400 of FIG. 4. As shown, in this example, the job listing table also allows the user to perform various actions on the solver jobs, such as to examine the current execution log of the solver job, or to cancel or stop a submitted or running solver job. As discussed, in some embodiments, the execution log may be received as a continuous data stream, so that the additions to the log can be seen via the management interface in real time.

The bottom portion of the GUI 710 is a job status view 720 that displays additional execution data about a selected job in the listing (here the last job in the listing). As shown, section 730 indicates certain configuration information about how the job was executed, including the solver used and various solver and resource parameters. Section 740 displays certain performance data associated with the solver execution, including any execution errors, CPU and memory usages, and whether an optimal solution was found. As discussed, in some embodiments, the execution parameter information and execution performance data may be saved in an anonymized manner and used to inform solver or resource recommendations generated by the solver execution service for other solver jobs.

As show, the GUI 710 also provides a number of buttons to navigate to other interfaces of the solver execution service, including a button 750 to view the solution generated by the solver execution, a button 752 to edit the model of the solver job, and a button 754 to edit the solver job configuration of the solver job (e.g. via GUI 610 of FIG. 6).

Figure 8:
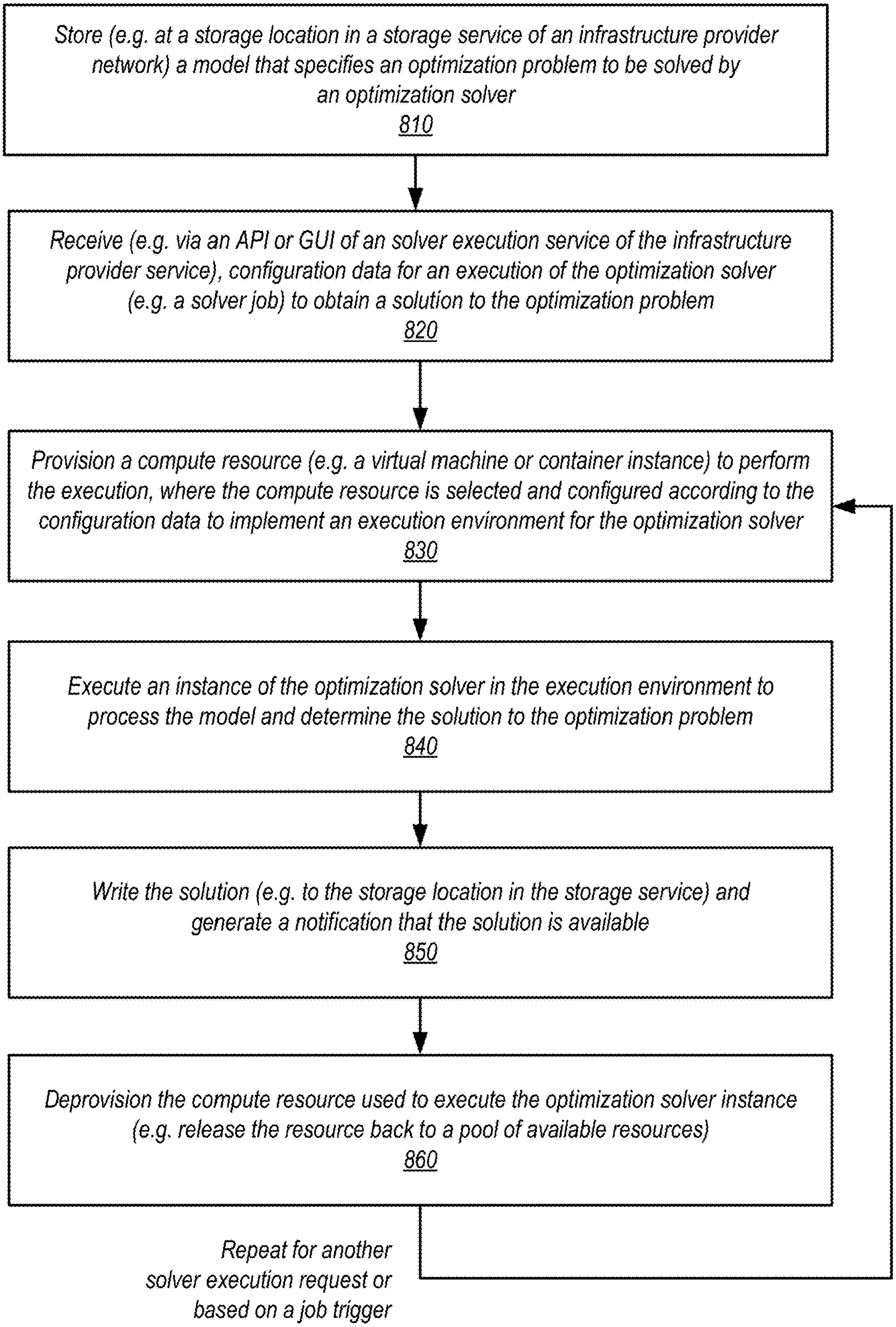
FIG. 8 is a flowchart illustrating a process of the solver execution service solving an optimization problem using a configured optimization solver and compute resource, according to some embodiments.

FIG. 8 is a flowchart illustrating a process of the solver execution service solving an optimization problem using a configured optimization solver and compute resource, according to some embodiments. The depicted process may be performed by an embodiment of the solver execution service 120 of FIG. 1.

As shown, the process begins at operation 810, where a model that specifies an optimization problem to be solved by an optimization solver is stored. In some embodiments, the model may be stored as a file or an object in a data storage service (e.g. data storage service 280). The data storage service may be implemented on a multi-tenant infrastructure provider network that provides and manages computing resources on behalf of many clients. The optimization solver may be one of multiple types of optimization solvers supported by the solver execution service, which is able to run instances of solvers on compute resources managed by the infrastructure provider network.

At operation 820, configuration data for an execution of the optimization solver is received. The configuration data may be specified as a solver execution request 110, which may be received via an API (e.g. service interface 122) or GUI (e.g. service console 106) of the solver execution service or the infrastructure provider service. The request may, as discussed in connection with request 300 of FIG. 3, create a solver job in the solver execution service. The request may specific various parameters of the solver job, such as the type of solver to use and solver parameters for the solver, the compute resource(s) to use to execute the solver and various parameters of the resource(s), and the locations of the input and output of the solver job. In some embodiments, some of the solver job parameters may be determined automatically based on preconfigured rules or one or more machine learning models.

At operation 830, a compute resource (e.g. compute resource instance 160) is provisioned to perform the solver execution according to the configuration data. The compute resource may be a virtual machine instance or container instance configured with the type of solver requested, and may be selected based on the configuration data to implement an execution environment for the optimization solver. In some embodiments, the compute resource is selected so that the execution environment is isolated from other execution environments used for other concurrently running solver jobs. For example, the execution environments may be prohibited from communicating directly with one another or sharing infrastructure resources with one another. In some embodiments, the compute resources are provided in a serverless manner, so that they are provisioned only for the duration of the solver execution and released after the execution is completed. In some embodiments, the service may maintain one or more pools of available compute resource instances to be reused for new solver jobs. The resource pools may be dynamically scaled based on current demand for the pools.

At operation 840, an instance of the optimization solver (e.g. optimization solver instance 166) is executed in the execution environment on the compute resource. The solver instance will read the model from the storage location and perform an optimization algorithm to determine a solution to the optimization problem specified by the model. In some embodiments, execution data about the solver execution is logged to an execution log. In some embodiments, as the solver execution progresses, status changes about the solver job are reported to the solver execution service.

At operation 850, the solution (e.g. solution 174) is written to the storage location. In some embodiments, the solution may be written to a different storage location as the model. In some embodiments, when the solution is written, a notification may be generated (e.g. as an event via the event dispatch service 270) indicating that the solution is now available. In some embodiments, the notification may be pushed to the client that initiated the solver execution request. In some embodiments, the notification may cause a management interface (e.g. solver job management interface 710) of the solver execution service to be updated to indicate the completion of the solver job.

At operation 860, the compute resource used to execute the optimization solver instance is deprovisioned. In some embodiments, deprovisioning a compute resource may simply mean terminating the resource instance. In some embodiments, the compute resource instance may be cleaned up and returned to the resource pool for use by other solver jobs. A cleanup process may involve removing any artifacts left by the solver execution, closing network connections, revoking resource access permissions, and untagging resources used for the solver execution. As shown, the process may then be repeated for another solver execution request or based on a job execution trigger.

Figure 9:
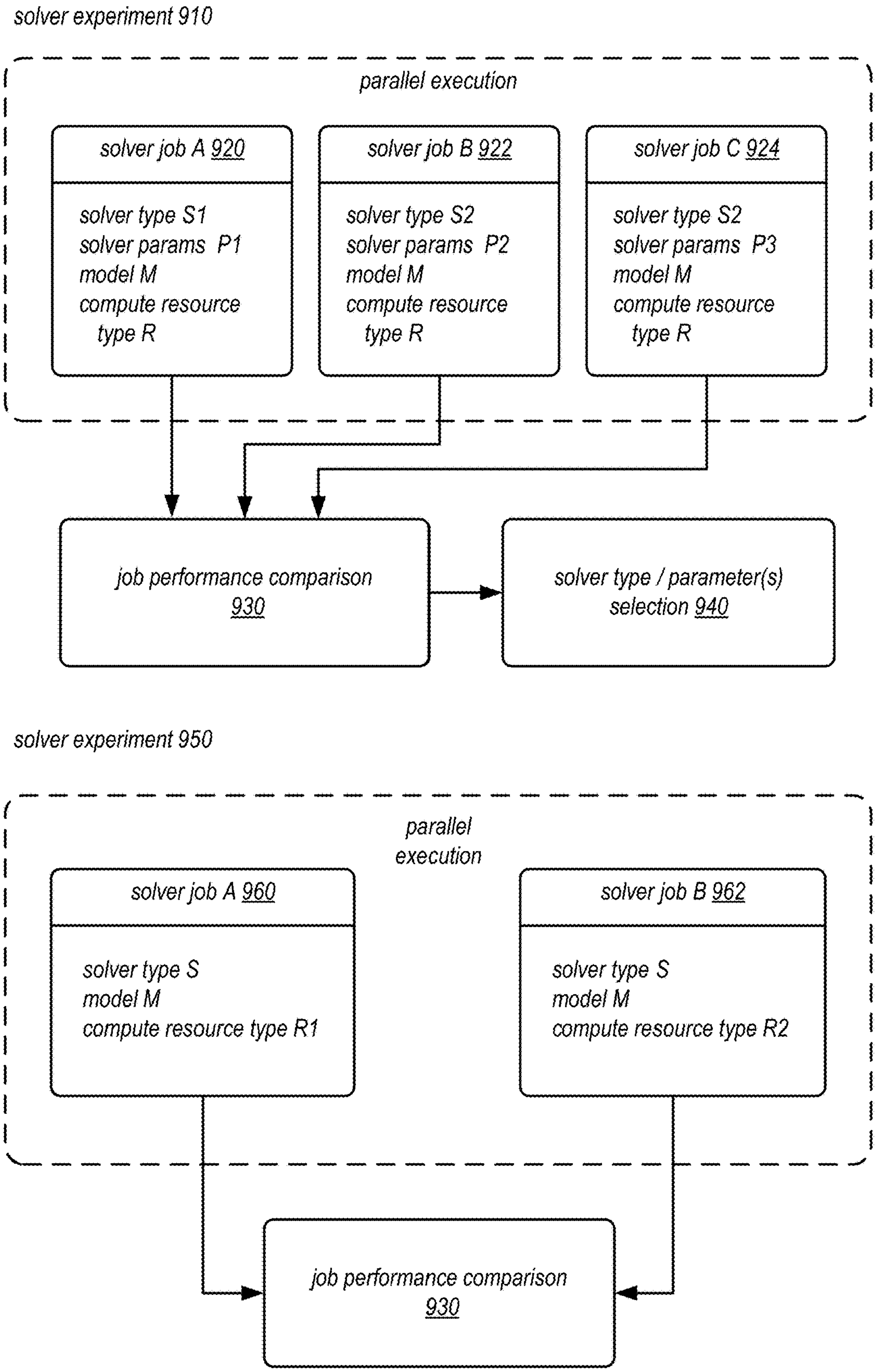
FIG. 9 illustrates experiments that can be performed using the solver execution service to compare different types of optimization solvers and compute resources, according to some embodiments.

FIG. 9 illustrates experiments that can be performed using the solver execution service to compare different types of optimization solvers and compute resources, according to some embodiments.

As discussed, current optimization solver platforms can pose significant problems associated with vendor lock-in, so that once a company begins to use one type of solver, it becomes extremely difficult for the company to switch to another type of solver. The problem is due in part to the substantial upfront costs of using these solver platforms, and also incompatibilities between the modeling formats of the different solver platforms. To mitigate vendor lock-in, embodiments of the solver execution service 120 implement a translation capability to translate model representations between different types of solver platforms. Additionally, embodiments of the solver execution service provide a solver experimentation interface that allows developers to conduct evaluative experiments to compare the functionality and performance of different solvers to determine the solver that is best suited for the particular problem.

As shown, the top of FIG. 9 depicts a first type of solver experiment 910 that compares three different solver jobs: solver job A 920, solver job B 922, and solver job C 924. In some embodiments, the solver experiment 910 may be configured as a special type of solver job that executes multiple component solver jobs (e.g. solver jobs A, B, and C) in parallel. The solver experiment job may be defined via an API (e.g. service interface 122) or a GUI (e.g. service console 106) of the solver execution service. In some embodiments, the solver execution service may allow the user to run the experiment on only a subset of the problem space (e.g. by constraining the problem model), so that the experiment will not take a long time to explore the full problem space. In some embodiments, a solver experiment job may involve multiple experiment runs on different portions of the problem space.

As shown in this example, the solver experiment job is using three different solver job configurations to solve the same model M, using the same type of compute resource R. Solver job A 920 uses solver type S1 and a set of solver parameters P1. Solver job B 922 uses a different solver type S2 and a set of solver parameters P2. Solver job C 924 also uses solver type S2 and a different set of solver parameters P3. The job performance data of the three solver jobs are captured and compared via a job performance comparison component 930. In some embodiments, the job comparison component 930 may simply present the jobs' performance data side-by-side to a user (e.g. via the solver console). In some embodiments, the job comparison component 930 may programmatically select 940 a best performing solver and solver parameters based on the performance data, and recommend the best solver to the user.

Depending on the embodiment, the manner that the selection 940 is made may be specified by configuration data (e.g. configuration data of the solver experiment job). The performance data evaluated by the job performance comparison 930 may include different types of performance metrics, including the time taken to find a solution or the quality of the solution. In some cases, the solver configuration that was the fastest to arrive at an optimal solution will be deemed to be the best. In other cases, the solver configuration that produced the most optimal solution (e.g. based on the objective function score) within a specified time period will be considered the best. Other performance metrics may be taken into account to assess the quality of the solution, including primal and dual infeasibility bounds and residuals, and the gap percentage. In some cases, certain optimization status codes and error codes generated by the solver and the level of resource usage by a solver configuration may also be considered as factors when comparing solve execution performance.

In some embodiments, the solver execution service allows users to compare the performance of not just different types of solvers, but also different types of compute resources and resource parameters used for an experiment run. As shown, the bottom portion of FIG. 9 depicts another solver experiment 940 that runs two solver jobs A 950 and B 952 in parallel to compare two types of compute resources R1 and R2 running the same solver type S. As with experiment 910, the performance data of the two solver jobs are compared by the job performance comparison component 930 to select a best performing compute resource option and resource configuration.

In some embodiments, in order to run the solver experiment, the solver execution service may recognize that two different types of solvers use different model representations and automatically translate the model representation of an available model for one solver to the model representation of another solver. For example, a first solver may use a proprietary problem modeling language to define the problem in a particular syntax, and a second solver may use a different problem modeling language in another syntax. As another example, a solver may build the model in code using a general programming language such as Python, which makes calls to an API of the solver provided in the programming language. The solver execution service may provide a collection of model translators to translate among the different model representations.

In some cases, the output of a solver job may also be in a proprietary format that is specific to the particular solver, and the solver execution service will automatically translate the output into a common format. The solver execution service will save any translated input and output data in the storage location(s) specified by the solver job, so that the translated data can be accessed by the client.

Figure 10:
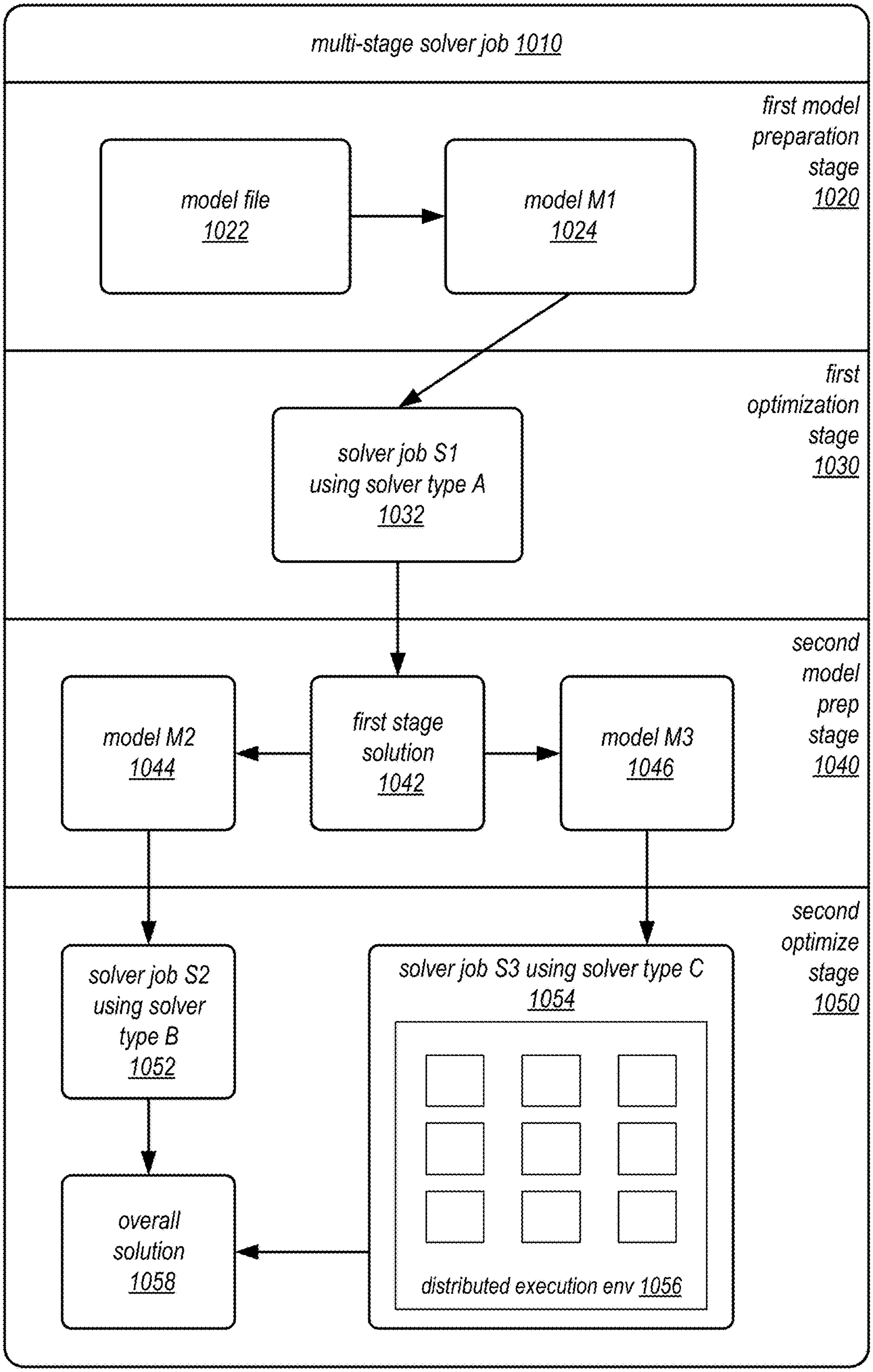
FIG. 10 illustrates a multi-stage solver job supported by the solver execution service that uses two different types of optimization solvers, according to some embodiments.

FIG. 10 illustrates a multi-stage solver job supported by the solver execution service that uses two different types of optimization solvers, according to some embodiments.

Certain types of optimization problems can be solved in distinct optimization stages. For example, in some situations, it is possible to break an optimization problem into a first stage that reduces the problem to a simplified solution space (e.g. determine a set of feasible solutions that satisfies the problem constraints), and a second stage that finds an optimal solution in the reduced solution space (e.g. find a solution that has the highest objective function value). As another example, an earlier stage of the optimization process may be used to reduce the number of decision variables, consolidate and eliminate constraints, or reformulate the problem into a different problem type. To implement these types of multi-stage optimization processes, embodiments of the solver execution service allow developers to define multi-stage solver jobs that solve optimization problems in multiple stages. Because the solver execution service can support multiple solver types, each stage in a multi-stage solver job can be run using a different solver and on a different compute resource instance.

FIG. 10 depicts an example multi-stage solver job 1010. In some embodiments, the multi-stage solver job 1010 may be defined as a compound solver job on top of multiple component jobs for the individual stages or steps of the optimization process. The multi-stage solver job may be defined using an API (e.g. service interface 122) or a GUI (e.g. service console 106) of the solver execution service. In some embodiments, the multi-stage solver job may be defined as a workflow, via a service such as the workflow orchestration service 260. As discussed, such a service may be used to construct a workflow with steps spanning multiple types of services, including machine learning services and other data processing or analytic services. In some embodiments, the component jobs that implement the multi-stage solver job can be programmatically linked using triggers in the solver execution service.

As shown in this example, multi-stage solver job 1010 begins with a first model preparation stage 1020. As shown, this stage 1020 populates a model file M1 1024 with values from a model file 1022 (e.g. a spreadsheet file of model parameters). This step may be performed for certain types of solvers that allow the model to refer to values from an external file. In some embodiments, the solver execution service considers the external parameter file 1022 to be part of the model, so that any changes in the parameter file will trigger a solver execution.

As shown, stage 1030 is a first optimization stage, where a solver job S1 is executed 1032 using solver type A. Solver job S1 may be executed on a compute resource instance that is specifically configured for that job. Solver job S1 outputs a first stage solution 1042.

As shown, stage 1040 is a second model preparation stage that converts or translates the first stage solution 1042 into a second model M2 1044 and a third model M3 1046. For example, the first stage solution 1042 may be split into two sub-problems (e.g. different sets of decision variables) that will be solved separately by different solver jobs. In some embodiments, such a step may be performed by a specialized translator that is specifically designed for this particular step. In some embodiments, this translation or conversion step may be unnecessary, as first solver job S1 may produce an output that is directly usable by the subsequent solver stage.

As shown, once the model M2 is prepared, the second optimization stage 1050 is executed. As shown, in this example, the second optimization stage 1050 is performed with two solver jobs in parallel: a second solver job S2 1052 and a third solver job S3 1054. As shown, the solver job S2 executes an instance of solver type B on model M2 using another compute resource instance configured for that job. Solver job S3 executes on a distributed execution environment 1056 that comprises multiple compute resource instances. All of the computing resources used by solver job S3 may be provisioned on demand when solver job S3 is launched, and released after solver job S3 completes. In some embodiments, the compute resources in the distributed execution environment may be connected to create a compute cluster that can communicate and share intermediate results with one another as the execution progresses. As discussed, the characteristics of the distributed computing environment 1056 may be specified by the configuration data associated with solver job S3, or in some cases programmatically determined by the solver execution service itself. As a result of solver jobs S2 and S3, an overall solution 1058 of the multi-stage solver job 1010 is generated and written to data storage. In some embodiments, the overall solution may be generated by a final solver job to combine the findings of solver jobs S2 and S3.

As will be appreciated by those skilled in the art, using this approach, developers can mix and match multiple types of optimization solvers to implement an optimization process that is custom tailored to a particular problem, allowing the developer fine-grained control over each step of the optimization process. In some embodiments, the solver execution service will track the execution status of multi-stage solver job at each individual stage, and allow the user to stop the multi-stage solver job (including any component jobs running in parallel) with the click of a button.

Figure 11:
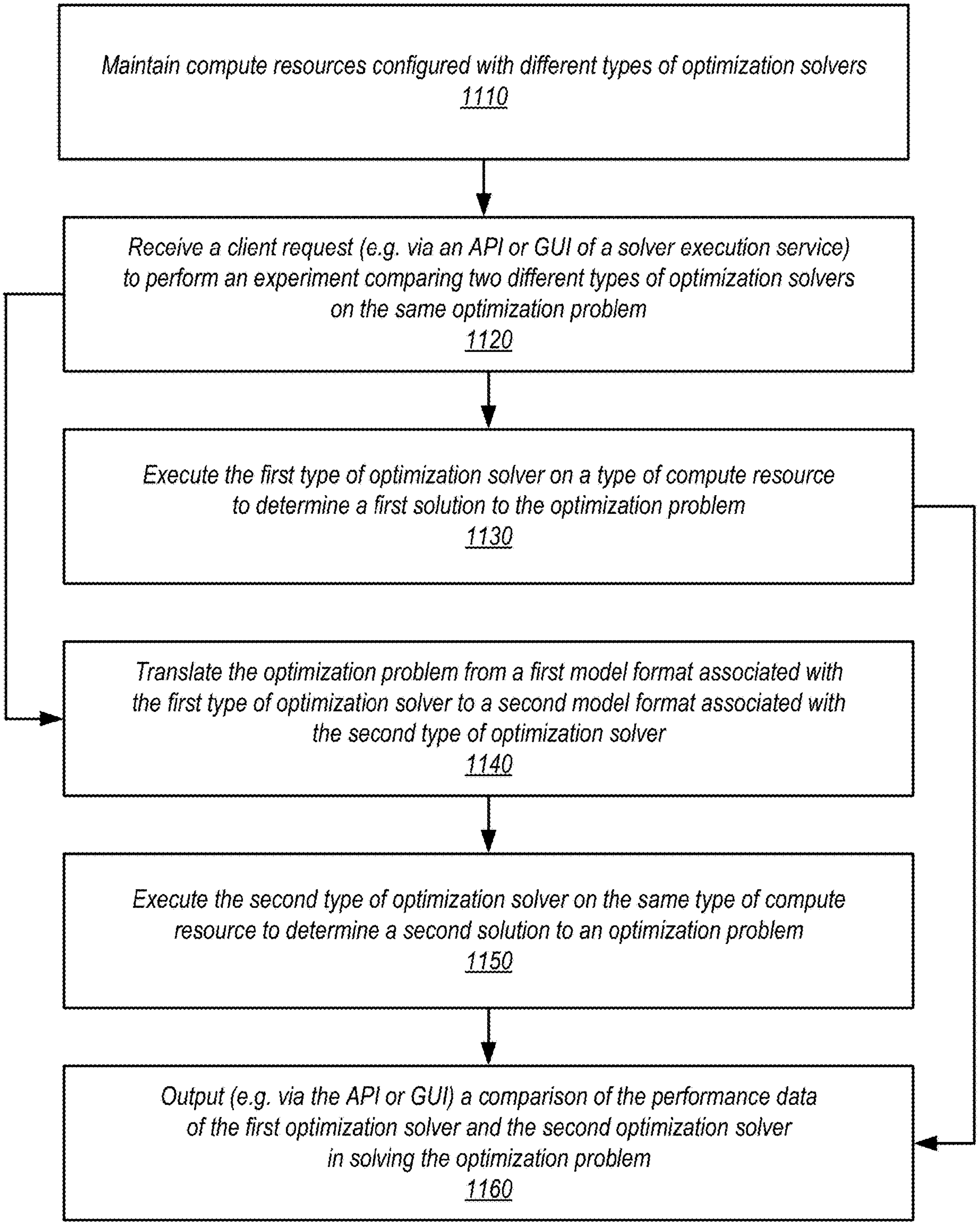
FIG. 11 is a flowchart illustrating a process of the solver execution service performing an experiment to compare two different types of optimization solvers, according to some embodiments.

FIG. 11 is a flowchart illustrating a process of the solver execution service performing an experiment to compare two different types of optimization solvers, according to some embodiments. The depicted process may be performed by an embodiment of the solver execution service 120 of FIG. 1.

At operation 1110, the service maintains computer sources (e.g. compute resources 154*a* and 154*b*) configured with different types of optimization solvers supported. As discussed, the compute resources may be provisioned in a serverless manner to execute solver jobs specified by client solver execution requests. In some embodiments, the compute resources may be virtual machine or container instances.

At operation 1120, a client request is received (e.g. via an API or GUI of the solver execution service), where the request specifies to perform an experiment comparing two or more different types of optimization solvers on the same optimization problem. In some embodiments, the client request may specify configuration data for a solver experiment job, as discussed in connection with FIG. 9. The solver experiment job may specify different solver execution configurations to be compared, including different solver types, different solver parameters, different compute resource types, and different compute resource parameters. In some embodiments, all solver execution configuration may be executed in parallel as independent solver jobs.

At operation 1130, the first type of optimization solver is executed on a type of compute resource to determine a first solution to the optimization problem. This execution may be performed in a similar manner as discussed in connection with FIG. 8.

At operation 1140, the optimization problem model is translated by the service from a first model format associated with the first type of optimization solver to a second model format associated with the second type of optimization model. As discussed, different solver platforms may use different model representations or formats. If a particular solver included in the experiment cannot read a model in the available format, the service may automatically translate the available model into the model format supported by the particular solver. The translated model may be saved by the solver execution service so that it is available to the developer for further use.

Once the model for the second type of optimization solver is generated, at operation 1150, the second type of optimization solver is executed on the same type of compute resource as the first type of optimization solver, and a second solution to the optimization problem is determined. This execution may be performed in a similar manner as discussed in connection with FIG. 8.

Finally, at operation 1160, performance data of the two solvers are compared and output (e.g. via the API or GUI of the solver executions service). The performance data may be captured during the two executions of the two solvers, and may include performance metrics such as the amount of time used to determine the first solution and the second solution, the objective function values of the first solution and the second solution, or respective resource usage levels associated with determination of the first solution and the second solution, In some embodiments, the comparison may be used by a recommendation system to automatically recommend a best performing solver based on the experiment results.

Figure 12:
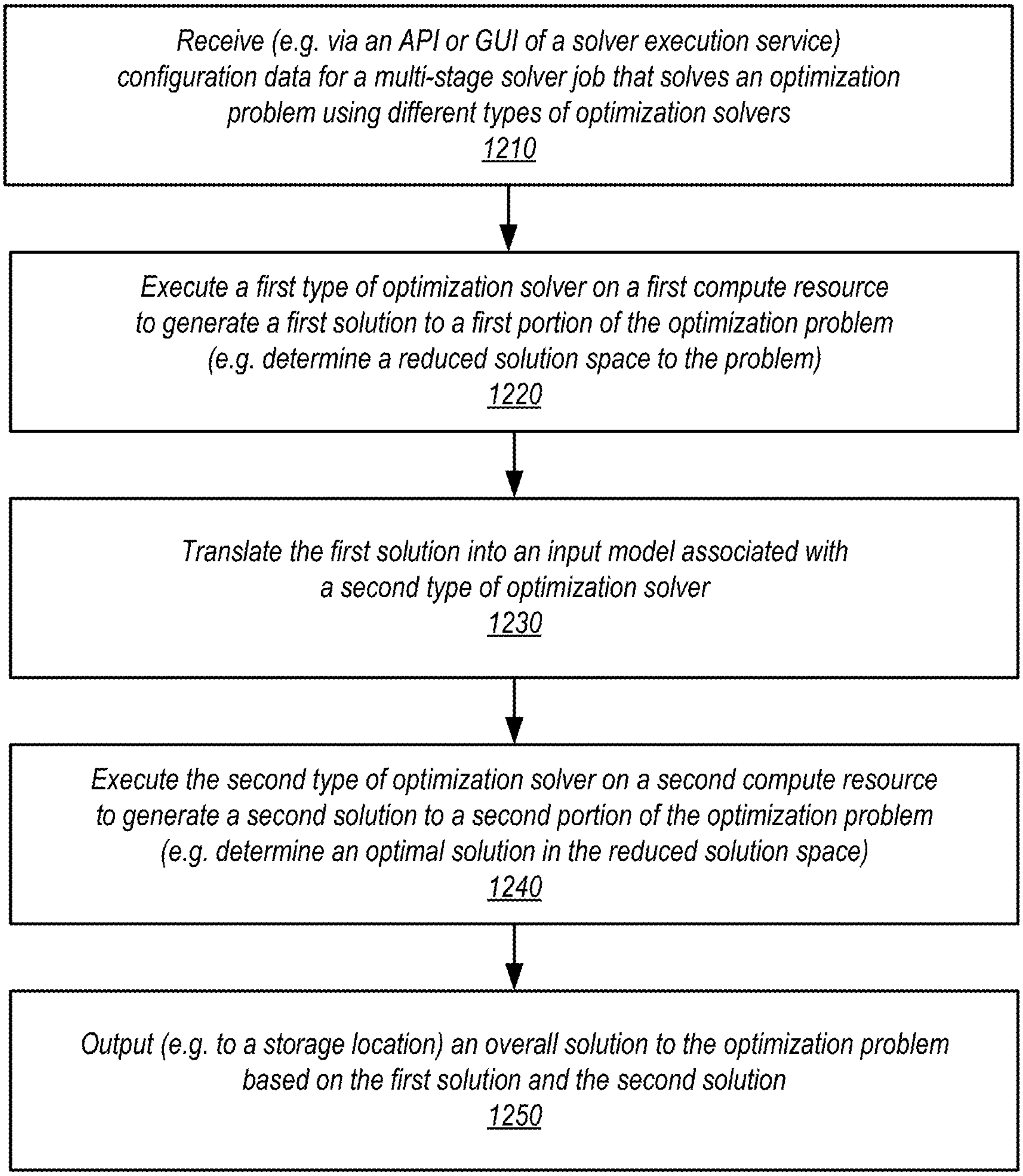
FIG. 12 is a flowchart illustrating a process of the solver execution service executing a multi-stage solver job using two different types of optimization solvers, according to some embodiments.

FIG. 12 is a flowchart illustrating a process of the solver execution service executing a multi-stage solver job using two different types of optimization solvers, according to some embodiments. The depicted process may be performed by an embodiment of the solver execution service 120 of FIG. 1, or the workflow orchestration service 260 of FIG. 2 that is integrated with the solver execution service.

At operation 1210, configuration data is received by the solver execution service (e.g. via an API or GUI of the service). The configuration data may be included as part of a client solver execution request to specify a multi-stage solver job that solves an optimization problem using different types of optimization solvers (e.g. multi-stage solver job 1010 of FIG. 10). In some embodiments, individual stages of the multi-stage solver job may be associated with a component solver job that uses a particular type of solver and a particular type of compute resource.

At operation 1220, a first type of optimization solver is executed on a first compute resource in accordance with the configuration data, to generate a first solution to a first portion of the optimization problem. Depending on how the multi-stage job is configured, the optimization problem may be divided into different portions to be solved in different stages. As one example, the first portion of the problem may be to find a locally optimal solution in a first region of the solution space. As another example, the first portion of the problem may be to simplify or reduce the solution space for the next stage of the optimization process (e.g. to determine only a subset of the decision variables or a smaller range for the decision variables). The component jobs in a multi-stage can be executed in parallel or serially, depending on the configuration.

At operation 1230, the first solution generated by the first type of optimization solve is translated into an input model associated with a second type of optimization for the second stage of the multi-stage solver job. In some embodiments, this translation may be performed by a specialized translator implemented by the solver execution service, as discussed in connection with stage 1040 of FIG. 10.

At operation 1240, the second type of optimization solver is executed in a second compute resource to generate a second solution to a second portion of the optimization problem. The second portion of the problem may be solved based on the output of the first stage (e.g. to determine an optimal solution in a reduced solution space represented by the input model produced by operation 1230). For example, the first stage solution may determine a subset of the decision variables in the optimization problem, and a second solver job may determine another subset of the decision variables. However, in some cases, the second solution may not depend on the first solution. For example, the second solution may represent a locally optimal solution in a different region of the solution space.

In some embodiments, the second solver execution may be executed on a distributed computing environment that uses many compute resource instances. The compute resource instances may be executed in parallel to work on different portions of the second solver execution. For example, each instance or node may optimize a different set of decision variables or process a different range of constraint values. In some embodiments, this second solver stage of the multi-solve job may be executed by another service distinct from the solver executions service, such as a separate machine learning service or data analytic service.

At operation 1250, an overall solution to the optimization problem is output. The output may be stored persistently to a storage location specified by the configuration data (e.g. solver job storage 170). In some cases, the overall solution may simply be the second solution. In some cases, the overall solution may be determined based on both the first and second solutions (e.g. based on the objective function values of the first and second solutions).

Figure 13:
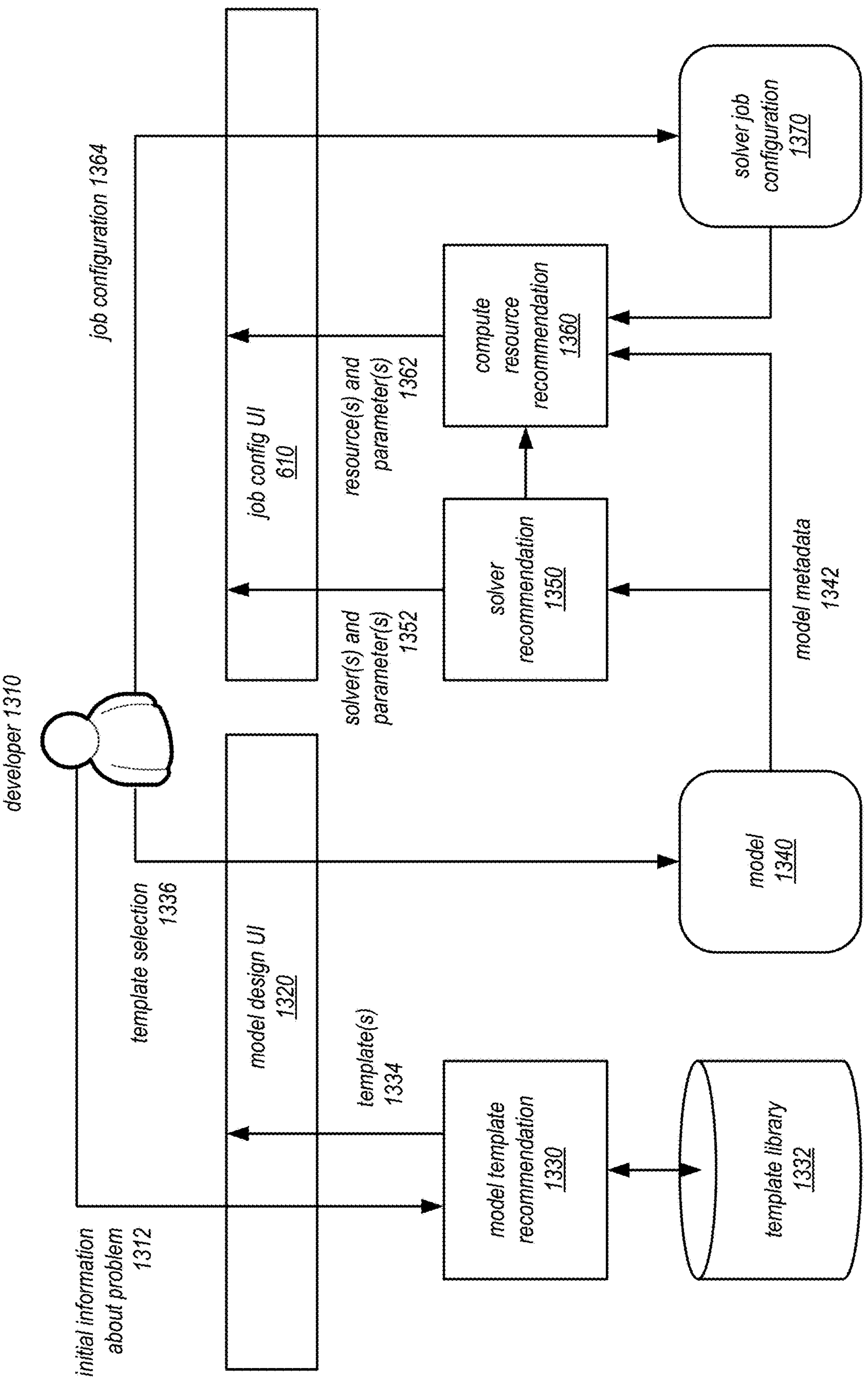
FIG. 13 illustrates recommendation systems implemented by the solver execution service to provide different types of recommendations to users during a model design and solver job configuration process, according to some embodiments.

FIG. 13 illustrates recommendation systems implemented by the solver execution service to provide different types of recommendations to users during a model design and solver job configuration process, according to some embodiments.

Optimization application development can have a steep learning curve. A new developer may not have sufficient knowledge about different solver platforms to select a solver or compute resource that is best suited for the optimization problem. After a solver is selected, it can still take some time for novice developers to acquire the expertise to comfortably create optimization models from scratch. Moreover, different solver platforms can employ vastly different programming and configuration interfaces, so that even an experienced developer can have substantial difficulties moving to a new solver platform.

To address these and other issues, embodiments of the solver execution service implement a number of recommendation systems to facilitate onboarding of new users and bridge the gap between a problem domain and the programming and configuration interfaces of the optimization solver. The recommendation systems may be configured to recommend options to the developer at different stages of the model development or execution configuration process. In some embodiments, the recommendation systems are powered by machine learning models that are trained to recommend model templates, solvers, and compute resources based on characteristics of the optimization problem, the model, and/or other execution configuration parameters. These recommendations enable developers to quickly get started creating new models in an unfamiliar solver environment and select appropriate execution parameters for the solver execution.

As shown, FIG. 13 depicts user interfaces (model design UI 1320 and job configuration UI 610) that may be used to implement the recommendation interfaces. In some embodiments, these interfaces may be implemented as a GUI (e.g. as part of the service console 106) to provide recommendations to developer(s) 1310 during the development or execution configuration process. In some embodiments, the GUI may be a notebook interface implemented on a developer endpoint that has a desired set of solver libraries loaded.

As shown, in some embodiments, the model design UI 1320 may initially query the developer 1310 about an optimization, for example, by posing a series of questions about the problem to the developer. In response, the developer will provide some initial information about the problem. The initial information may include information such as a problem type of the optimization problem, the domain of the problem, parameters of the model, the types of variables involved, etc. In some embodiments, a model template may be selected from a full model file that was previously created. A model template recommendation system 1330 will analyze the initial information 1312 and select one or more model templates 1334 from a template library 1332 and present the templates 1334 as recommendations to the developer. In some embodiments, model template 1334 may be domain specific, and contain model elements such as an objective function and constraints that were seen in previous models that were created for similar optimization problems. The template model may be generated in part by the model template recommendation system 1330 or simply an anonymized version of an actual model stored as a template in the template library 1332.

In some embodiments, the model design UI 1320 will allow the user to select 1336 one of the model templates recommended and generate a starter model 1340 from the template (e.g. the full model file). The generation may involve a translation from the problem model format of the template to a new problem model format specified by the developer. In some embodiments, the initial information about the problem 1312 and the template selection 1336 will create the model 1340 with little or no coding by the developer 1310. Once the model 1340 is created, the user is able to tweak or fill in the model parameters.

In some embodiments, after the developer edits the model 1340 via the model design UI 1320, the developer may switch to a job configuration UI 610, where the developer selects various execution parameters for solving the problem. During the execution configuration process, a solver recommendation system 1350 may make one or more recommendation 1352 about the type of solver to use for solving the model and solver parameter(s) of the solver via the job configuration UI 1352. In some embodiments, these recommendations 1352 may be made based on model metadata 1342 about the model 1340, which may include data about the number, type(s), or characteristics of object function(s) used by the model, a number or types of decision variables of the model, a number of types of constraints used in the model, or performance data obtained from one or more previous solver experiments (e.g. solver experiments 910 and 940).

In some embodiments, during the execution configuration process, a compute resource recommendation system 1360 may generate one or more recommendations 1362 about the type of compute resource to use to solve the model and parameter(s) of the compute resource. In some embodiments, the compute resource may be recommended based on the model metadata 1342, the solver type and solver parameters, and other configuration settings in the solver job configuration 1370. The developer 1310 may then accept or override the recommendation made by these recommendation systems, and save his or her configuration choices 1364 as part of the solver job configuration. Advantageously, the disclosed recommendation systems of the solver execution service can dramatically simplify and speed up the model design and solver execution configuration process.

Figure 14:
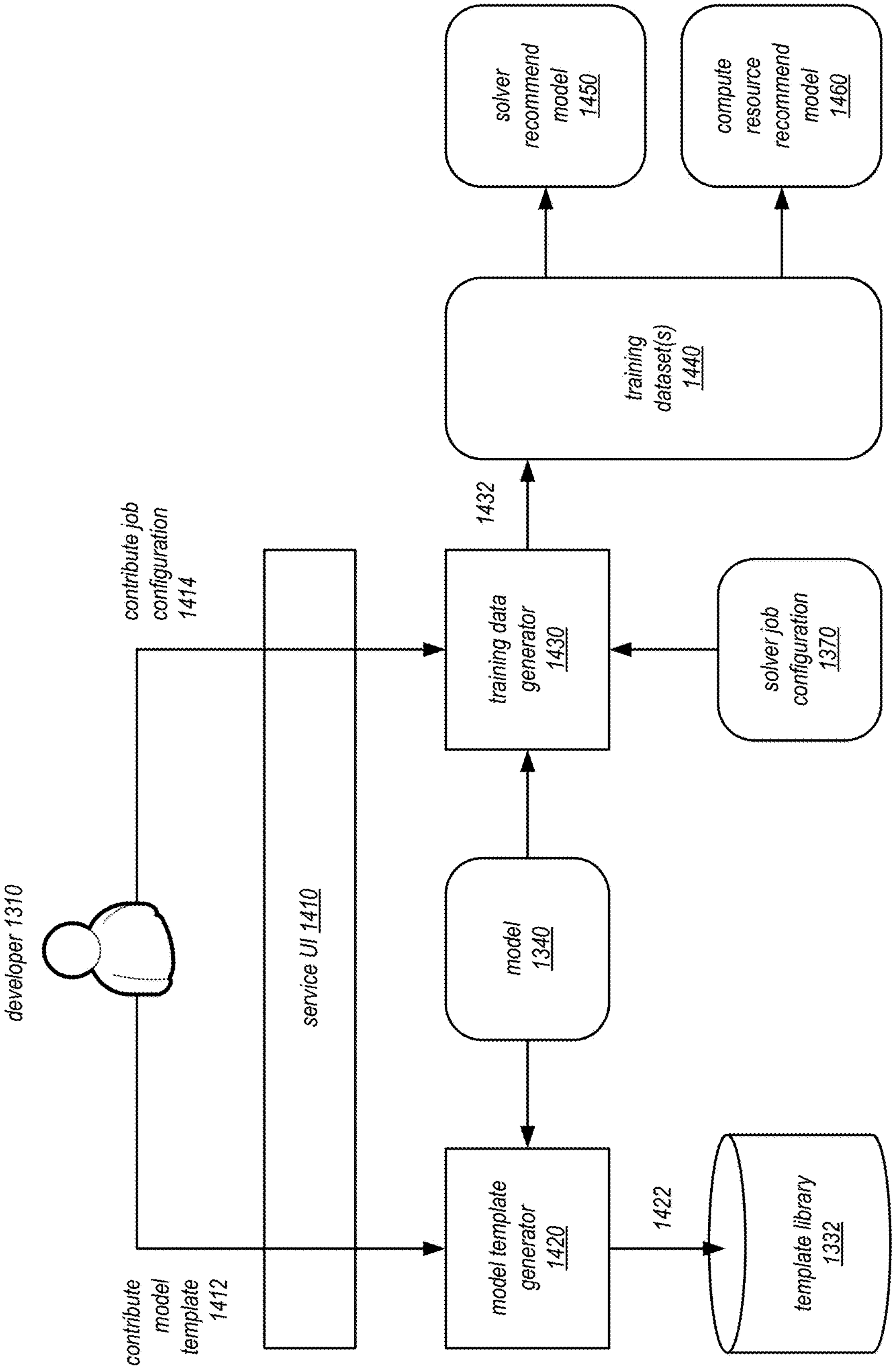
FIG. 14 illustrates functionality of the solver execution service that enables users to contribute data back to the service's recommendation systems, according to some embodiments.

FIG. 14 illustrates functionality of the solver execution service that enables users to contribute data back to the service's recommendation systems, according to some embodiments. In some embodiments, service UI 1410 depicted in the figure may be implemented as part of the service console 106 of FIG. 1.

In some embodiments, the recommendations made by the recommendation systems of FIG. 13 may be based on contributions of other users of the solver execution service. As shown, in some embodiment, the developer 1310 may make a request 1412 to contribute a finished model 1340 to the template library 1332. A model template generator 1420 will generate a model template from the model 1340 (e.g. removing certain proprietary elements from the model), and store the model template in the template library 1332 for use by the template recommendation system 1330. In some embodiments, certain information about the contributed model such as domain information and model metadata are extracted and stored with the model template, so that the stored template can be searched based on search information.

In some embodiments, the solver recommendation system 1350 and compute resource recommendation system 1360 of FIG. 13 may be implemented using machine learning models (e.g. solver recommendation model 1450 and compute resource recommendation model 1460). These models may be trained using one or more global training dataset(s) 1440 containing job configuration data contributed by users of the solver execution service. As shown, developer 1310 may make a request 1414 to contribute his or her ultimate solver job configuration to the recommendation systems. In response, a training data generator 1430 will generate 1432 training data for the machine learning models based on the model 1340 and the solver job configuration 1370. The training data may contain various input features about the model 1340 (e.g. the model metadata) and the job configuration 1370. The training data may be used to train the machine learning models to predict the solver type, solver parameter(s), compute resource type, and computer resource parameter(s) based on the input feature data. The machine learning models may be retrained periodically based on newly contributed training data to maintain or improve their recommendation quality. In some embodiments, the machine learning models may be trained using only training data from a particular client or group of clients, so that the recommendations generated by the recommendation systems are specific to only the client or group of clients.

In some embodiments, instead of machine learning models, the recommendation systems may be implemented using other techniques such as statistical methods or configured recommendation rules. These other recommendation techniques may still be gradually tuned based on observed developer behavior collected from individual developers. For example, a developer's choice to use a particular type of solver for a type of problem may update solver usage statistics about that type problem, so that the solver is more likely to be recommended for the problem type. As another example, recommendation rules may be automatically tuned or adjusted based on developer behavioral statistics.

Figure 15:
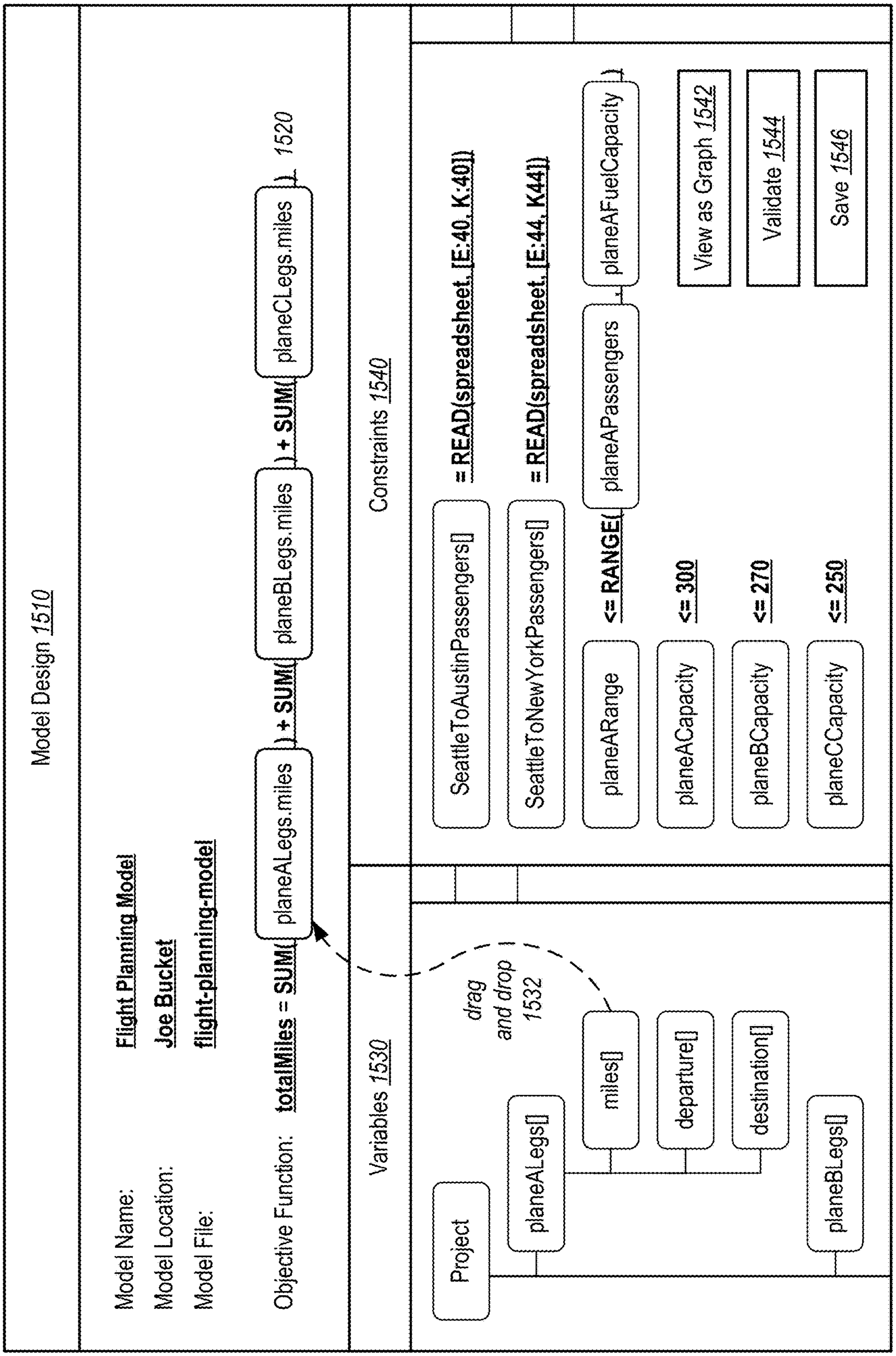
FIG. 15 illustrates a model design user interface of the solver execution service that allows users to design a model for an optimization problem, according to some embodiments.

FIG. 15 illustrates a model design user interface of the solver execution service that allows users to design a model for an optimization problem, according to some embodiments. The model design GUI 1510 depicted in the figure is an embodiment of the model design UI 1320 of FIG. 13.

GUI 1510 may be used to design a model used by an optimization solver. In some embodiments, as shown here, a model may be defined in a problem modeling language, to specify elements such as the objective function 1520 for the model, the variables 1530 used by the model, and constraints 1540 of the model. As discussed, in some embodiments, some of these elements may be part of a recommended model template that was used to generate the model.

In some embodiments, the model design GUI 1510 may implement variables in the model as draggable elements, so that they can be added to other elements of the model (e.g. the objective function 1520 and the constraints) via a drag and drop operation 1532. In some embodiments, some elements of the objective function 1520 and constraint rules 1540 (e.g. the operators) may be auto-completed or inferred based on the variables or syntactical rules. In this manner, the model developer is able to edit the model in a user-friendly manner, minimizing unnecessary manual coding by the developer.

As shown, in this example, the model design GUI 1510 provides buttons to perform developer actions on the model. Button 1542 will generate a graph view from the elements of the model to allow the user to view and edit the optimization problem as a graph. In some embodiments, the graph will link various model elements such as variables, constraints, and objectives as different types of graph nodes. Related elements may be grouped as sub-graphs. In some embodiments, the graph view allows different nodes and/or sub-graphs to be connected via hypergraph edges to define association and/or operator types between the nodes and/or sub-graphs. Button 1544 will validate the current model, for example, using the solver to parse the model to check for any syntax errors. Finally, button 1546 saves the model to the solver job's storage location.

Figure 16:
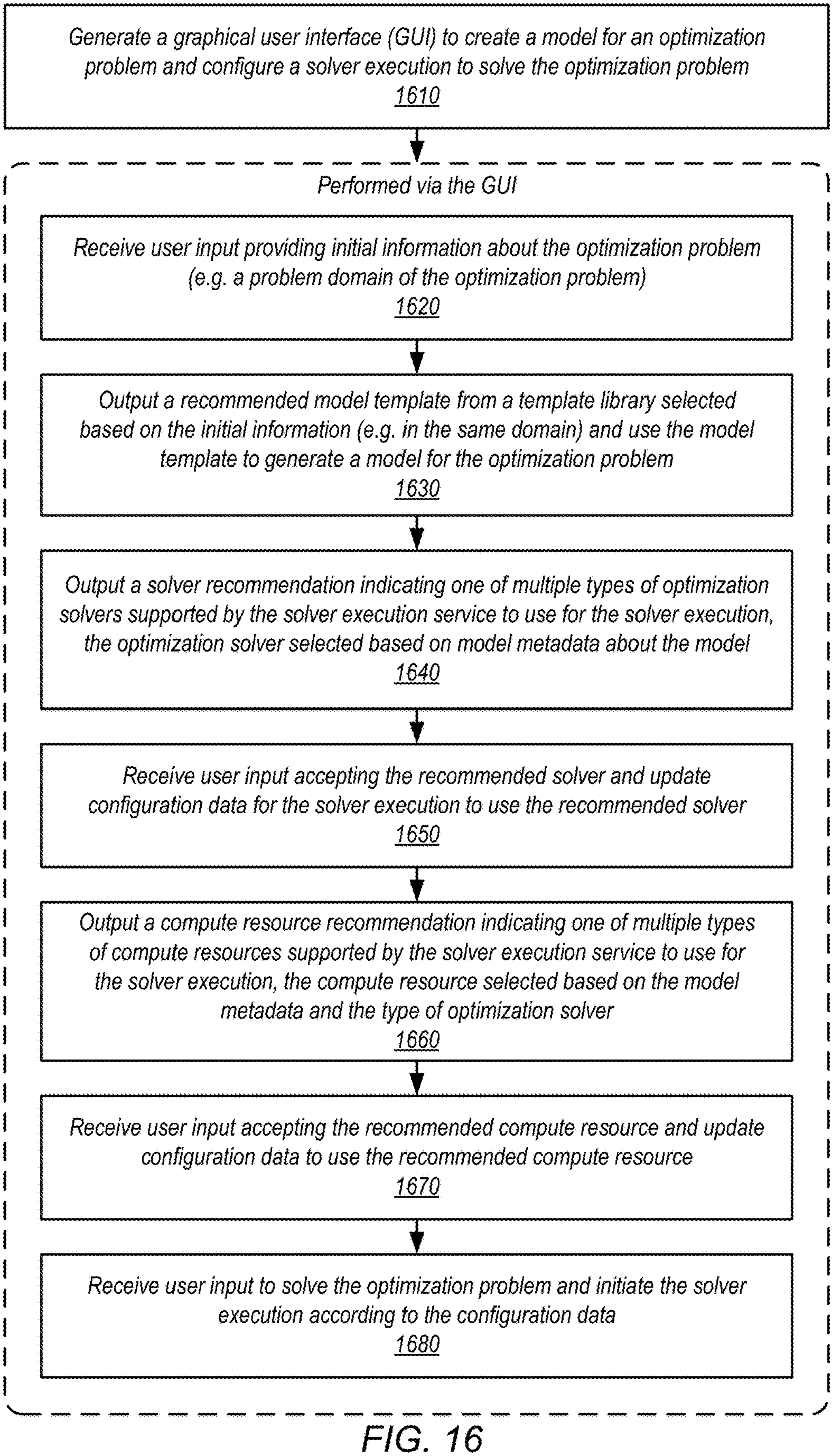
FIG. 16 is a flowchart illustrating a process of the solver execution service interacting with a user via a user interface to create a model for an optimization problem and configure a solver execution, according to some embodiments.

FIG. 16 is a flowchart illustrating a process of the solver execution service interacting with a user via a user interface to create a model for an optimization problem and configure a solver execution, according to some embodiments. The process may be performed by an embodiment of the solver execution service 120 of FIG. 1, and the GUI described in the figure may be an embodiment of the service console 106 of FIG. 1.

At operation 1610, the GUI is generated to create a model for an optimization problem and configure a solver execution to solve the optimization problem. In some embodiments, the GUI may be implemented as a series or graphical steps (e.g. webpages) that takes the developer through a multi-step configuration process. As shown, the remaining operations of the process are performed via the GUI.

At operation 1620, the GUI receives user input that provides initial information about the optimization problem. The initial information may be received in response to a questionnaire generated by the solver execution service. The initial information may indicate the problem domain of the optimization problem, as well as other information such as a general description of the problem, the type of objective function or optimization algorithm, the types of decision variables and constraints, etc.

At operation 1630, the GUI outputs a recommended model template from a template library (e.g. template library 1332). The template is selected based on the initial information, by a component such as the model template recommendation system 1330, and may be displayed along with a general description of the model. In some embodiments, if the user selects or approves the recommended template, a starting version of the model for the optimization problem is generated using the template. In some embodiments, the model generation process may involve translating the model to a model format that is different from the format that the model template is stored in.

At operation 1640, the GUI outputs a solver recommendation indicating one of multiple types of optimization solvers supported by the solver execution service to use for the solver execution, and optionally solver parameters of the solver to use for the solver execution. The optimization solver is selected based on model metadata about the model, such as the type of objective function of the model, a number or types of decision variables of the model, or the number or types of constraints of the model. In some embodiments, the model metadata may include performance results of the solver obtained from an experiment performed by the solver execution service. In some embodiments, the solver recommendation may be generated by a machine learning model that is trained using training data contributed by many users of the service. The selection may be performed by a component such as the solver recommendation system 1350 of FIG. 13.

At operation 1650, the GUI receives further user input accepting the recommended solver (and any recommended solver parameters) and updates the configuration data for the solver execution to use the recommended solver and recommended solver parameters. The configuration data may be job configuration data 142 stored in a solver job management database 140, as discussed in connection with FIG. 1.

At operation 1660, the GUI outputs a compute resource recommendation that indicates one of multiple types of compute resources supported by the solver executions service to use for the solver execution, and optionally resource parameters of the compute resources. In some embodiments, the types of compute resource may include virtual machine instances, container instances, or quantum compute resources. The resource parameters may specify characteristics of the resource such as the type and number of CPUs used (e.g. a type of GPU), the amount of memory implemented on the resource, the operating system or software libraries installed in the resource, etc. The compute resource is selected based on the model metadata about the model, the type of optimization solver, and/or other configuration settings in the configuration data. In some embodiments, the compute resource recommendation may be generated by a machine learning model that is trained using training data contributed by many users of the service. The selection may be performed by a component such as the compute resource recommendation system 1360 of FIG. 13.

At operation 1670, the GUI receives further user input accepting the recommended compute resource (and any recommended resource parameters) and updates the configuration data for the solver execution to use the recommended compute resource and recommended resource parameters.

At operation 1680, the GUI receives user input to solve the optimization problem, and in response, initiates the solver execution according to the configuration data. The user input to solve the optimization problem may be generated via a control element of the GUI, such as the execute button 664 of FIG. 6.

Figure 17:
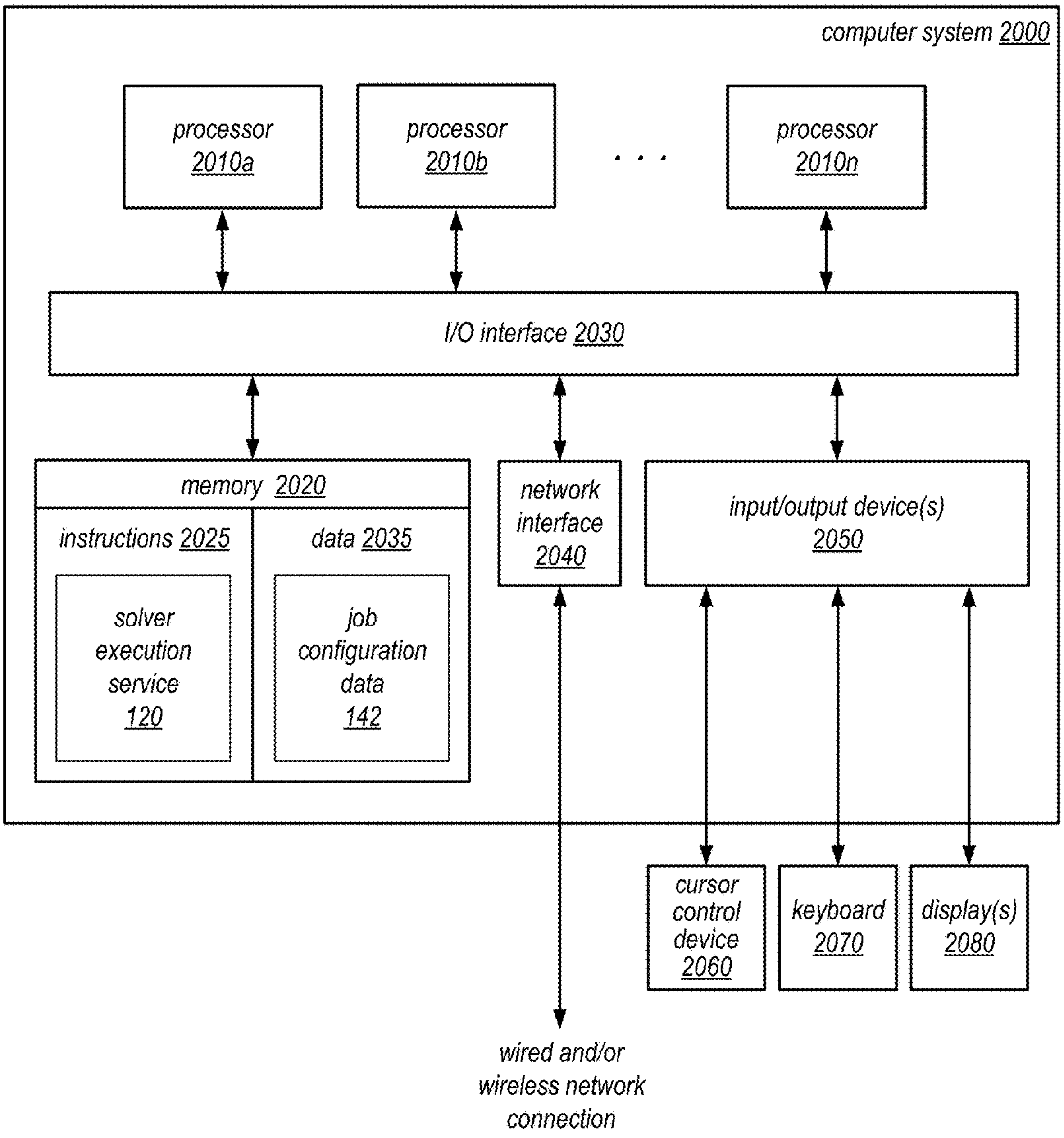
FIG. 17 illustrates an example computer system that can be used to implement portions of the solver execution service described herein, according to some embodiments.

FIG. 17 illustrates an example computer system that can be used to implement portions of the solver execution service described herein, according to some embodiments.

In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, computing system compute system, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown, memory 2020 may include program instructions 2025, may implement the various methods and techniques as described herein, and data storage 2035, comprising various data accessible by program instructions 2025. In one embodiment, program instructions 2025 may include software elements of embodiments as described herein and as illustrated in the figures. For example, the program instructions 2025 may be used to implement the functions of solver execution service 120. Data storage 2035 may include data that may be used in embodiments. For example, the data store 2035 may be used to store the solver job configuration data 142. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention encompasses all such modifications and changes and, accordingly, the above description to be regarded in an illustrative rather than a restrictive sense.

What is claimed is:

1. A system, comprising:

one or more computing devices that implement an infrastructure provider network that provides a plurality of infrastructure services, including:

a storage service that stores an optimization problem model specifying an optimization problem; and a solver execution service configured to:

receive configuration data for an execution of an optimization solver using the optimization problem model to determine a solution to the optimization problem, wherein the configuration data is useable by the solver execution service to:

provision a compute resource to perform at least a portion of the execution, wherein the compute resource is configured according to the configuration data to implement an execution environment for the optimization solver;

execute an instance of the optimization solver in the execution environment to process the optimization problem model and determine the solution to the optimization problem; and write the solution to the storage service and generate a notification that the solution is available.

2. The system of claim 1, wherein:

the compute resource is provisioned by a serverless compute service provided by the infrastructure provider network;

the compute resource is a virtual machine instance, a container instance, or a quantum computing resource configured to execute the optimization solver;

the compute resource belongs to a pool of available compute resources managed by the serverless compute service; and the serverless compute service releases the compute resource back to the pool after the execution.

3. The system of claim 1, wherein the configuration data specifies one or more of:

a number of processors or processor cores of a virtual machine to use for the execution;

a type of processor of the virtual machine;

an amount of memory of the virtual machine;

a first storage location of the optimization problem model in the storage service; and a second storage location in the storage service to write the solution.

4. The system of claim 1, wherein:

the solver execution service is a multitenant service that performs a plurality of solver executions for a plurality of clients in parallel; and individual ones of the solver executions are performed in isolated execution environments.

5. The system of claim 1, wherein the solver execution service provisions a distributed execution environment for the execution that includes a plurality of compute resource instances, and the optimization solver is executed on individual ones of the compute resource instances to solve different portions of the optimization problem.

6. A method, comprising:

performing, by a solver execution service implemented by one or more computing devices:

receiving configuration data for an execution of an optimization solver to determine a solution to an optimization problem, wherein the optimization problem is stored as a model at a first storage location, provisioning a compute resource to perform at least a portion of the execution, wherein the compute resource is configured according to the configuration data to implement an execution environment for the optimization solver;

executing an instance of the optimization solver in the execution environment to process the model and determine the solution to the optimization problem; and writing the solution to a second storage location.

7. The method of claim 6, wherein:

the solver execution service is implemented by an infrastructure provider network;

the compute resource is provisioned by a serverless compute service implemented by the infrastructure provider network; and the compute resource is a virtual machine instance or a container instance configured with software to execute the optimization solver.

8. The method of claim 6, further comprising the solver execution service:

selecting the compute resource based at least in part on one or more properties of the model.

9. The method of claim 6, wherein:

the first storage location is a client storage location allocated to a client of the solver execution service;

the second storage location is the same client storage location;

the model is stored as a first object in the client storage location; and the solution is stored as a second object in the client storage location.

10. The method of claim 6, wherein:

the solver execution service implements an application programming interface (API) configured to receive client requests;

the configuration data is received via the API in a first request;

the provisioning of the compute resource, the executing of the optimization solver, and the writing of the solution are performed as part of a first solver job initiated based upon the first request; and the solver execution service returns, in accordance with the API, a response indicating a job identifier of the first solver job.

11. The method of claim 10, further comprising the solver execution service:

receiving, via the API, a second request specifying a trigger for executing a second solver job; and initiating execution of the second solver job in response to a detection that the trigger is satisfied.

12. The method of claim 11, further comprising the solver execution service:

storing a plurality of triggers for a plurality of solver jobs, including (a) a first trigger that specifies a schedule for initiating an associated solver job, and (b) a second trigger that specifies to initiate another solver job when a model associated with the other solver job is changed.

13. The method of claim 10, further comprising the solver execution service:

monitoring executions of a plurality solver jobs and tracking status information about the solver jobs in a job management database; and responsive to a second request received via the API, returning status information about one or more of the solver jobs in the job management database.

14. The method of claim 10, further comprising the solver execution service:

responsive to a second request received via the API, stopping a second solver job in the solver execution service before completion of the second solver job.

15. The method of claim 10, further comprising the solver execution service:

determining in the configuration data a resource tag for the first solver job; and tagging the compute resource with the resource tag, wherein the resource tag is used to associate the first solver job to events generated by the first solver job.

16. The method of claim 10, further comprising the solver execution service:

logging analytics data about a plurality of solver jobs including solver parameters, resource parameters, and performance data associated with individual ones of the solver jobs; and using the analytics data to generate recommended configuration data for another solver job.

17. The method of claim 10, further comprising the solver execution service:

tracking usage data indicating usage of the solver execution service by a client account;

determining, based at least in part on the usage data, that the client account has exceeded a usage limit, and in response:

throttling a next solver job associated with the client account.

18. The method of claim 10, wherein:

the server execution service executes the optimization solver under a license; and the method further comprises assessing a licensing fee to a client account based at least in part on the license.

19. One or more non-transitory computer-readable storage media storing program instructions that when executed on or across one or more processors implement a solver execution service and cause the solver execution service to:

receive configuration data for an execution of an optimization solver to determine a solution to an optimization problem, wherein the optimization problem is stored as a model at a first storage location, and in response:

provision a compute resource to perform at least a portion of the execution, wherein the compute resource is configured according to the configuration data to implement an execution environment for the optimization solver;

execute an instance of the optimization solver in the execution environment to process the model and determine the solution to the optimization problem; and write the solution to a second storage location.

20. The one or more non-transitory computer-readable storage media of claim 19, wherein the program instructions when executed on or across the one or more processors cause the solver execution service to:

initiate a first solver job in response to a first request received via an application programming interface (API) of the solver execution service, wherein the first solver job provisions the compute resource and executes the optimization solver; and return, in response to the first request and in accordance with the API, a response indicating a job identifier of the first solver job.

* * * * *